US012206712B2

(12) United States Patent
Guy et al.

(10) Patent No.: US 12,206,712 B2
(45) Date of Patent: *Jan. 21, 2025

(54) METHOD FOR CHARACTERIZING SECURITY TECHNOLOGY DEPLOYMENT TELEMETRY ACROSS A COMPUTER NETWORK

(71) Applicant: Sevco Security, Inc., Austin, TX (US)

(72) Inventors: Jeffrey J. Guy, Austin, TX (US); Dean Mekkawy, Austin, TX (US); Jeremiah Clark, Austin, TX (US); Nevins Bartolomeo, Austin, TX (US); Luis Diego Cabezas, Austin, TX (US)

(73) Assignee: Sevco Security, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,992

(22) Filed: Apr. 12, 2023

(65) Prior Publication Data

US 2023/0328108 A1 Oct. 12, 2023

Related U.S. Application Data

(63) Continuation of application No. 17/861,007, filed on Jul. 8, 2022, now Pat. No. 11,659,008, which is a continuation-in-part of application No. 17/720,163, filed on Apr. 13, 2022, now Pat. No. 11,647,027.

(60) Provisional application No. 63/281,980, filed on Nov. 22, 2021, provisional application No. 63/219,530, filed on Jul. 8, 2021, provisional application No. 63/174,485, filed on Apr. 13, 2021.

(51) Int. Cl.
*H04L 9/40* (2022.01)

(52) U.S. Cl.
CPC .......... *H04L 63/20* (2013.01); *H04L 63/0876* (2013.01); *H04L 63/104* (2013.01)

(58) Field of Classification Search
CPC ... H04L 63/104; H04L 41/0893; H04L 41/12; H04L 63/102; G06F 9/45558
See application file for complete search history.

(56) References Cited

U.S. PATENT DOCUMENTS 11,659,008 B2 * 5/2023 Guy ...................... H04L 63/104 726/1
12,034,735 B2 * 7/2024 Guy ...................... H04L 63/102

(Continued)

*Primary Examiner* — Oleg Korsak

(74) *Attorney, Agent, or Firm* — Run8 Patent Group, LLC; Peter Miller

(57) ABSTRACT

A method includes identifying a first group of objects generated by security tools during a first time interval and containing cotemporal, analogous characteristics identifying a first endpoint device connected to a computer network; based on the first group of objects, confirming detection of the first endpoint device by a first security tool and a second security tool during the first time interval; identifying a second group of objects generated by security tools during a second time interval and containing cotemporal, analogous characteristics identifying the first endpoint device; based on the second group of objects, confirming detection of the first endpoint device by the second security tool during the second time interval; and responsive to absence of detection of the first endpoint device by the first security tool during the second time interval, generating a source remove event specifying removal of the first security tool from the first endpoint device.

20 Claims, 9 Drawing Sheets

(56) References Cited

U.S. PATENT DOCUMENTS

2005/0177642 A1* 8/2005 Motoyama .......... H04L 43/0817
709/230
2010/0191612 A1* 7/2010 Raleigh .............. H04L 41/0806
455/406

* cited by examiner

METHOD FOR CHARACTERIZING SECURITY TECHNOLOGY DEPLOYMENT TELEMETRY ACROSS A COMPUTER NETWORK

CROSS-REFERENCE TO RELATED APPLICATIONS

This Application is a continuation of U.S. patent application Ser. No. 17/861,007, filed on 8 Jul. 2022, which claims the benefit of U.S. Provisional Application No. 63/219,530, filed on 8 Jul. 2021, each of which is incorporated in its entirety by this reference.

Furthermore, U.S. patent application Ser. No. 17/861,001, filed on 8 Jul. 2022, is a continuation-in-part application of U.S. patent application Ser. No. 17/720,163, filed on 13 Apr. 2022, which claims the benefit of U.S. Provisional Application No. 63/174,485, filed on 13 Apr. 2021, and 63/281,980, filed on 22 Nov. 2021, each of which is incorporated in its entirety by this reference.

TECHNICAL FIELD

This invention relates generally to the field of information security and more specifically to a new and useful system and method for verifying security technology deployment efficacy across a computer network in the field of internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
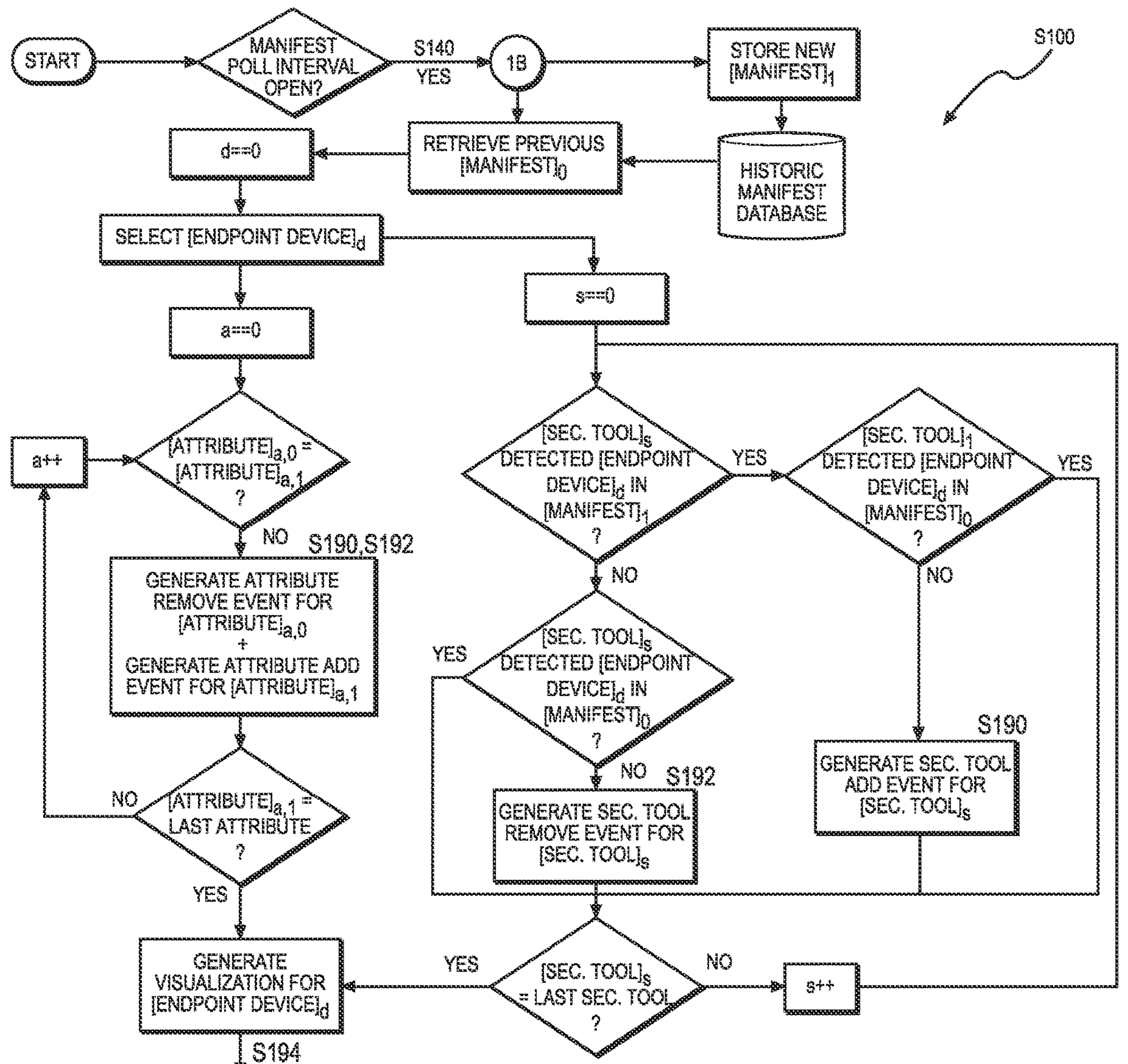
FIGS. 1A and 1B are a flowchart representation of a method.
Figure 1B:
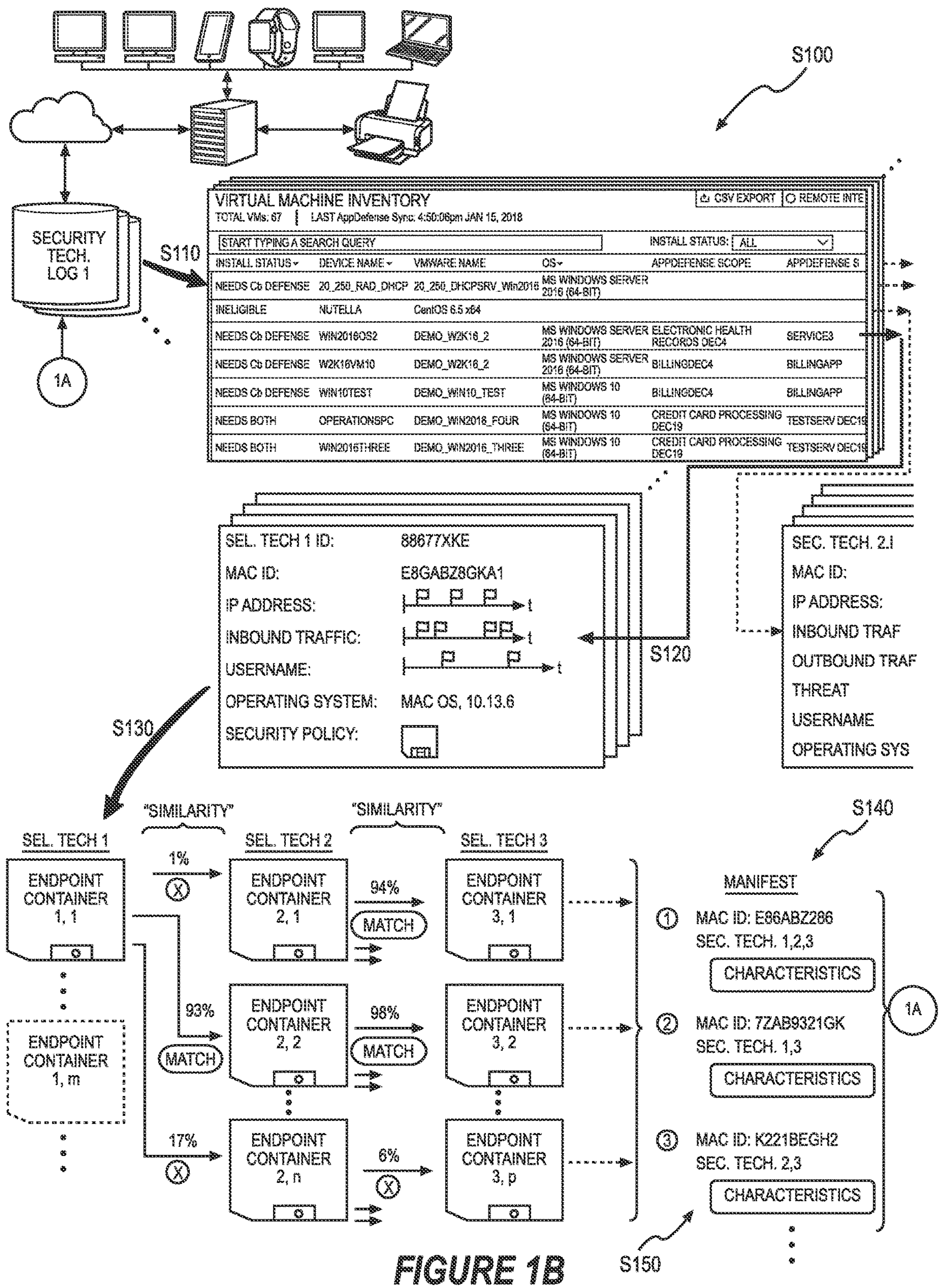

As shown in FIGS. 1A and 1B, a method S100 for deriving trends in security technology deployment efficacy across a computer network includes: identifying a first group of objects, in a first set of objects generated by a set of security tools during a first time interval, containing cotemporal and analogous characteristics identifying a first endpoint device (e.g., a traditional computing device, mobile device, IOT device, cloud infrastructure, etc. affiliated with one or more users), in a set of endpoint devices, connected to a computer network in Block S130; and populating a device record with a first set of characteristics representing the first endpoint device and extracted from the first group of objects in Block S180, the first set of characteristics including detection of the first endpoint device by a first security tool in the set of security tools during the first time interval and detection of the first endpoint device by a second security tool in the set of security tools during the first time interval. The method S100 also includes: identifying a second group of objects, in a second set of objects generated by the set of security tools during a second time interval, containing cotemporal and analogous characteristics identifying the first endpoint device in Block S130; and populating the device record with a second set of characteristics representing the first endpoint device and extracted from the second group of objects in Block S180, the second set of characteristics including detection of the first endpoint device by the first security tool during the second time interval. The method S100 further includes: in response to absence of detection of the first endpoint device by the first security tool during the second time interval, generating a first source remove event specifying removal of the first security tool from the first endpoint device in Block S192; and generating a first visualization representing the first source remove event in Block S194.

1.1 Attribute and Source Events

One variation of the method S100 shown in FIGS. 1A and 1B includes: accessing a first set of objects generated by a set of security technologies deployed on a computer network during a first time interval and representing characteristics identifying a first set of endpoint devices configured with combinations of the set of security technologies and connected to the computer network during the first time interval in Block S110; identifying a first group of objects, in the first set of objects and generated by multiple security tools in the set of security tools, containing cotemporal and analogous characteristics identifying a first endpoint device in the first set of endpoint devices in Block S130; and populating a device record, representing the first endpoint device, with a first set of characteristics extracted from the first group of objects in Block S180, the first set of characteristics including a first address of the first endpoint device during the first time interval, detection of the first endpoint device by a first security tool in the set of security tools during the first time interval, and detection of the first endpoint device by a second security tool in the set of security tools during the first time interval.

This variation of the method S100 also includes: accessing a second set of objects generated by the set of security technologies during a second time interval and representing characteristics identifying a second set of endpoint devices configured with combinations of the set of security technologies and connected to the computer network during the second time interval in Block S110; identifying a second group of objects, in the second set of objects and generated by multiple security tools in the set of security tools, containing cotemporal and analogous characteristics identifying the first endpoint device in Block S130; and populating the device record with a second set of characteristics extracted from the second group of objects in Block S180, the second set of characteristics including a second address of the first endpoint device during the second time interval, detection of the first endpoint device by the first security tool during the second time interval, and detection of the first endpoint device by the second security tool during the second time interval.

This variation of the method S100 further includes, in response to the second address differing from the first address: generating a first attribute remove event, in a first set of change events, specifying removal of the first address from the first endpoint device in Block S192; and generating a first attribute add event, in the first set of change events, specifying addition of the second address to the first endpoint device in Block S190.

This variation of the method S100 also includes: accessing a third set of objects generated by the set of security technologies during a third time interval and representing characteristics identifying a third set of endpoint devices configured with combinations of the set of security technologies and connected to the computer network during the third time interval in Block S110; identifying a third group of objects, in the third set of objects and generated by multiple security tools in the set of security tools, containing cotemporal and analogous characteristics identifying the first endpoint device in Block S130; and populating the device record with a third set of characteristics extracted from the third group of objects in Block S180, the third set of characteristics including the second address of the first endpoint device during the third time interval and detection of the first endpoint device by the second security tool during the third time interval.

This variation of the method S100 further includes: in response to absence of detection of the first endpoint device by the first security tool during the third time interval, generating a first source remove event, in the first set of change events, specifying removal of the first security tool from the first endpoint device in Block S192; and generating a first visualization representing the first set of change events occurring at the first endpoint device over time in Block S194.

1.2 Security Policy

Figure 3A:
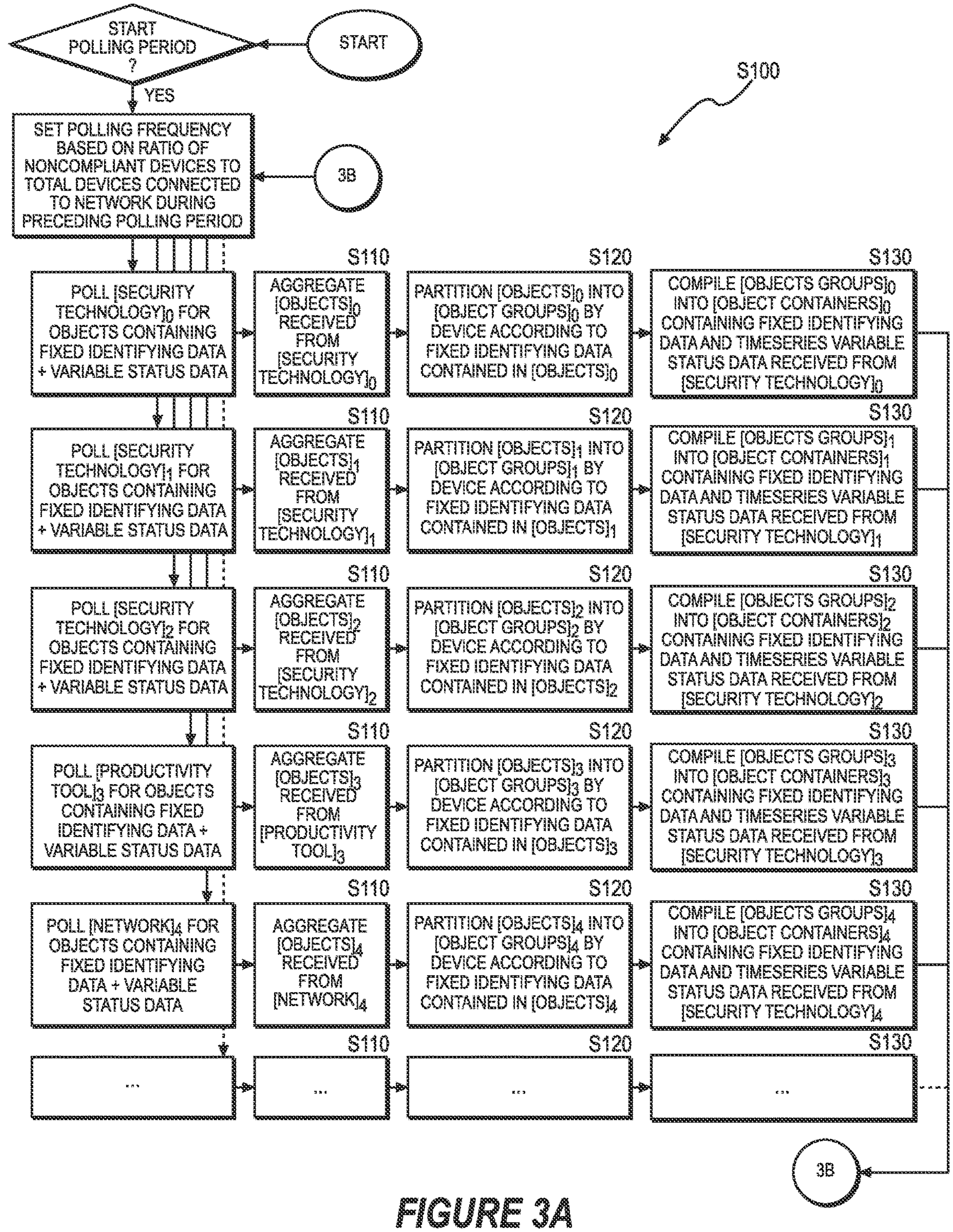
FIGS. 3A, 3B, and 3C are a flowchart representation of one variation of the method.
Figure 3B:
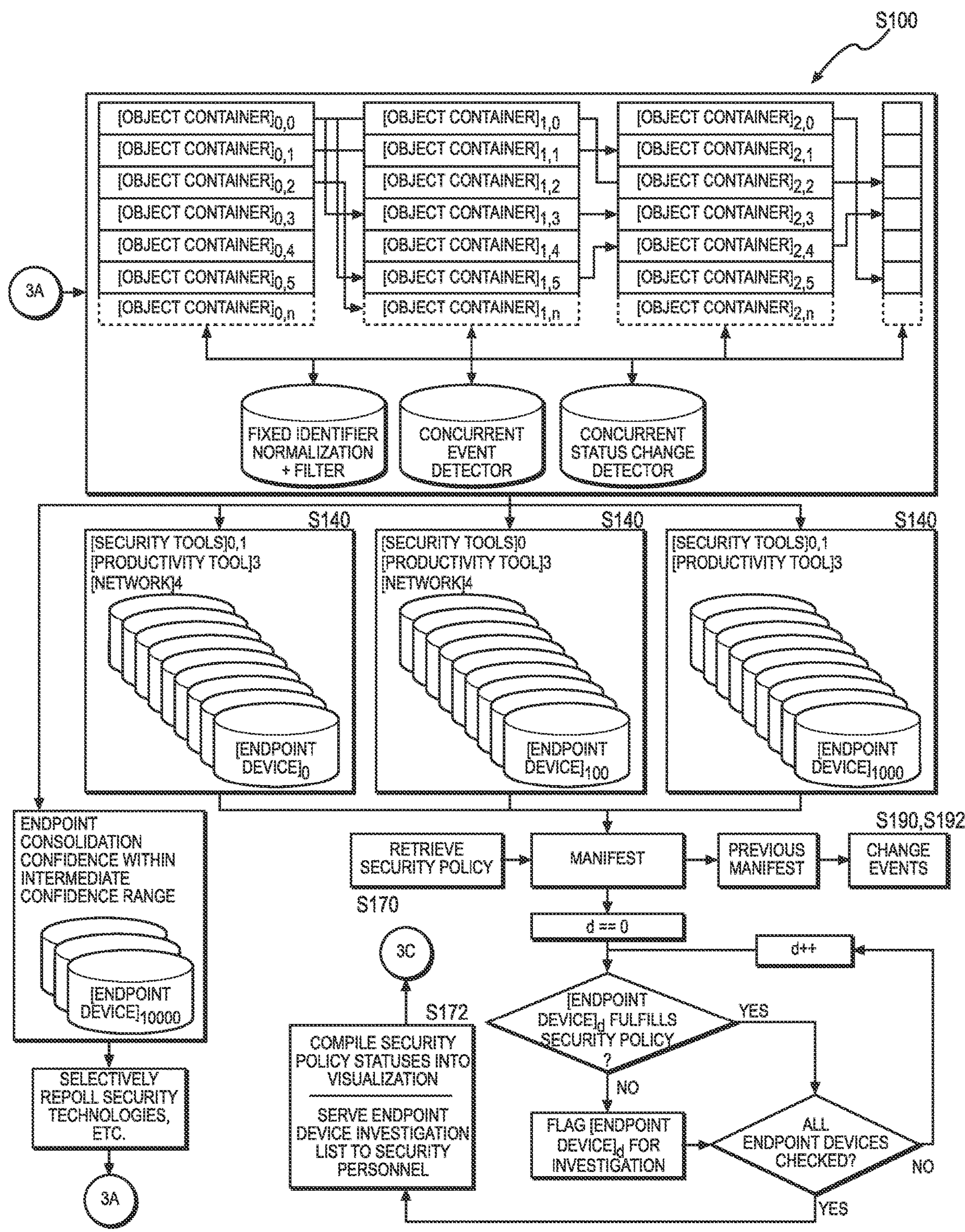
Figure 3C:
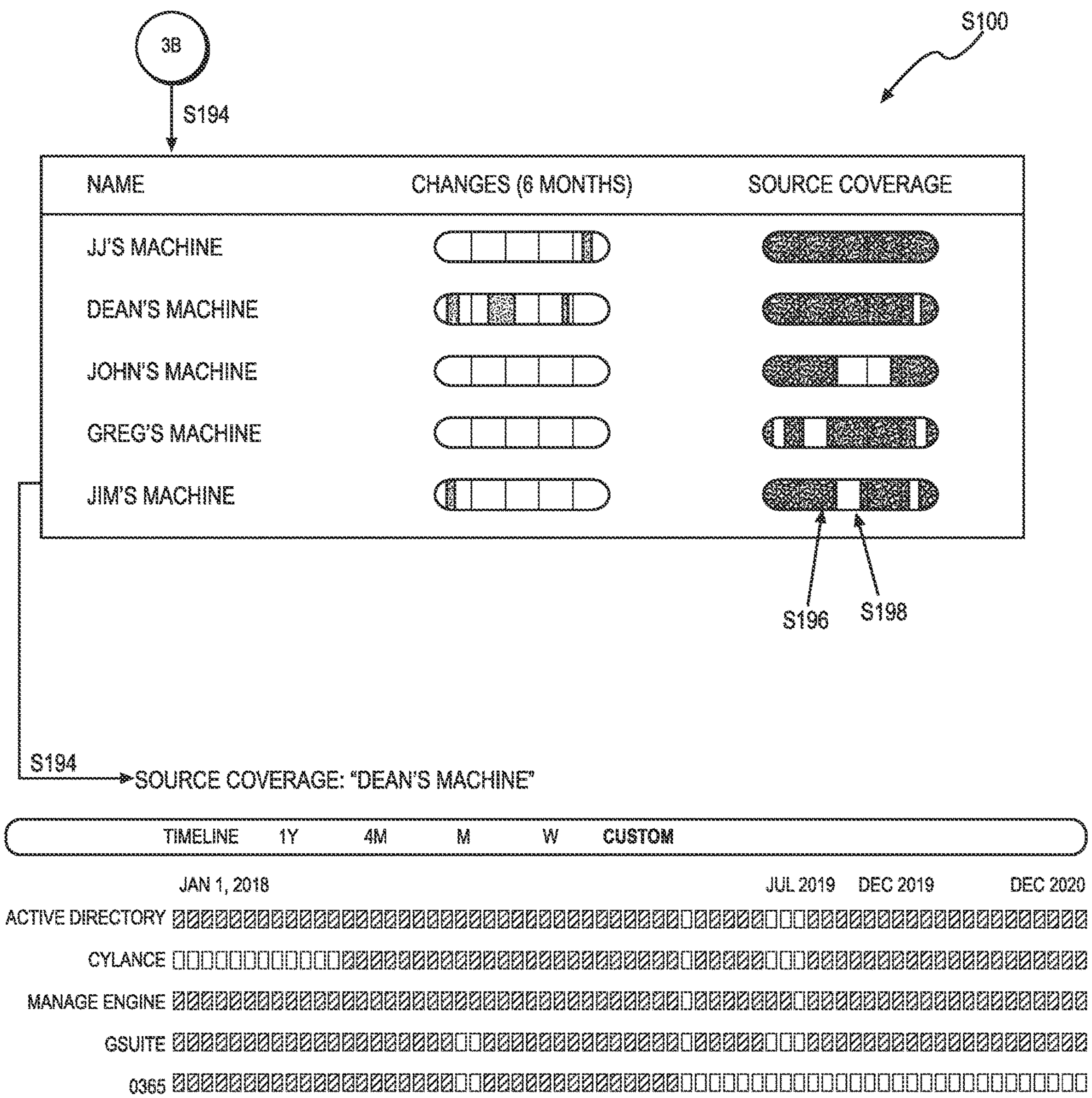

Another variation of the method S100 shown in FIGS. 3A, 3B, and 3C includes: accessing a security policy specifying deployment of a set of security tools on endpoint devices connected to a computer network in Block S170; identifying a first group of objects, in a first set of objects generated by the set of security tools during a first time interval, containing cotemporal and analogous characteristics identifying a first endpoint device, in a set of endpoint devices, connected to the computer network in Block S130; populating a device record with a first set of characteristics representing the first endpoint device and extracted from the first group of objects in Block S180, the first set of characteristics including detection of the first endpoint device by a first security tool in the set of security tools during the first time interval and detection of the first endpoint device by a second security tool in the set of security tools during the first time interval; and, based on the security policy and in response to detection of the first endpoint device by the first security tool and the second security tool during the first time interval, generating a first security policy verification event, in a set of security policy events, indicating verification of security tools deployed on the first endpoint device during the first time interval in Block S196.

This variation of the method S100 also includes: identifying a second group of objects, in a second set of objects generated by the set of security tools during a second time interval, containing cotemporal and analogous characteristics identifying the first endpoint device in Block S130; and populating the device record with a second set of characteristics representing the first endpoint device and extracted from the second group of objects in Block S180, the second set of characteristics including detection of the first endpoint device by a first security tool in the set of security tools during the first time interval.

This variation of the method S100 further includes: based on the security policy, in response to detection of the first endpoint device by the first security tool during the second time interval, and in response to absence of detection of the first endpoint device by the second security tool during the second time interval, generating a second security policy negation event, in the set of security policy events, indicating incomplete configuration of security tools deployed on the first endpoint device during second time interval in Block S198; and generating a first visualization representing the first set of security policy events in Block S194.

1.3 Manifests

Another variation of the method S100 shown in FIGS. 3A, 3B, and 3C includes generating a set of endpoint device containers by, for each security technology in the set of security technologies: accessing a set of objects generated by the security technology during a first time interval and representing characteristics of a subset of endpoint devices, in the set of endpoint devices, configured with the security technology; partitioning the set of objects into a set of object groups in Block S120, each object group in the set of object groups representing a sequence of statuses of an endpoint device, in the subset of endpoint devices, during the first time interval; and, for each object group in the set of object groups, aggregating characteristics represented in objects in the object group into an endpoint device container, in the set of endpoint device containers, associated with the security technology and including fixed identifying data and variable status data representing an endpoint device in the subset of endpoint devices in Block S130. This variation of the method S100 also includes: identifying a first subset of endpoint devices, in the set of endpoint devices, configured with a first security technology and a second security technology in the set of security technologies in Block S140 based on correspondence between fixed identifying data and variable status data contained in a first subset of endpoint device containers associated with the first security technology and the second security technology; and identifying a second subset of endpoint devices, in the set of endpoint devices, configured with the first security technology and excluding the second security technology in Block S140 based on absence of correspondence between fixed identifying data and variable status data contained in a second subset of endpoint device containers associated with the first security technology and the second security technology.

This variation of the method S100 further includes: assembling configurations of the set of security tools across the set of endpoint devices into a first manifest representing statuses of the set of security tools during the first time interval in Block S140; repeating this process to generate a series of manifests representing statuses of the set of security tools during subsequent time intervals; deriving a trend in statuses of the set of security tools over time from the series of manifests; and rendering the trend in a graphical visualization.

1.4 Assessments

Figure 6:
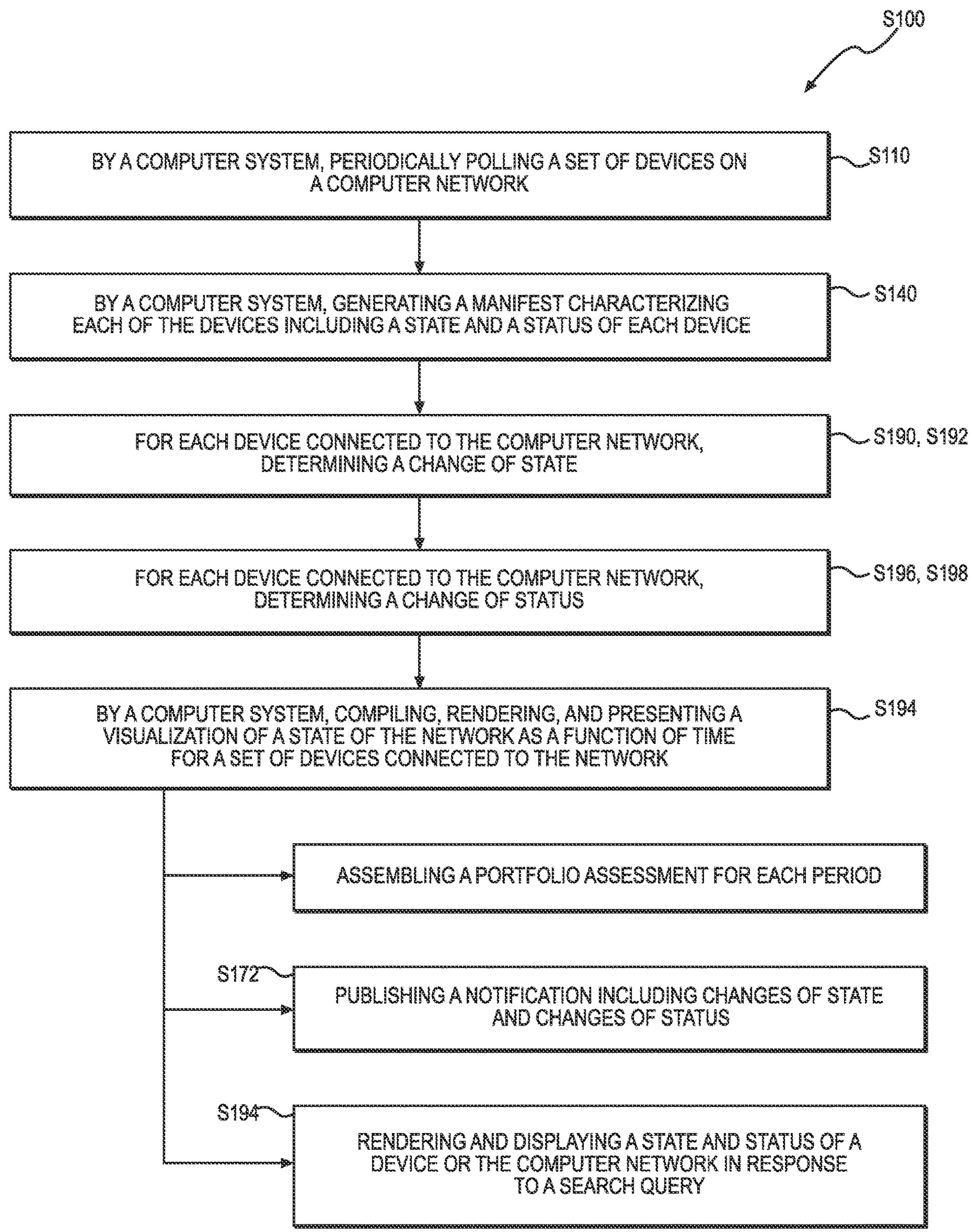
FIG. 6 is a flowchart representation of one variation of the method.
Figure 7:
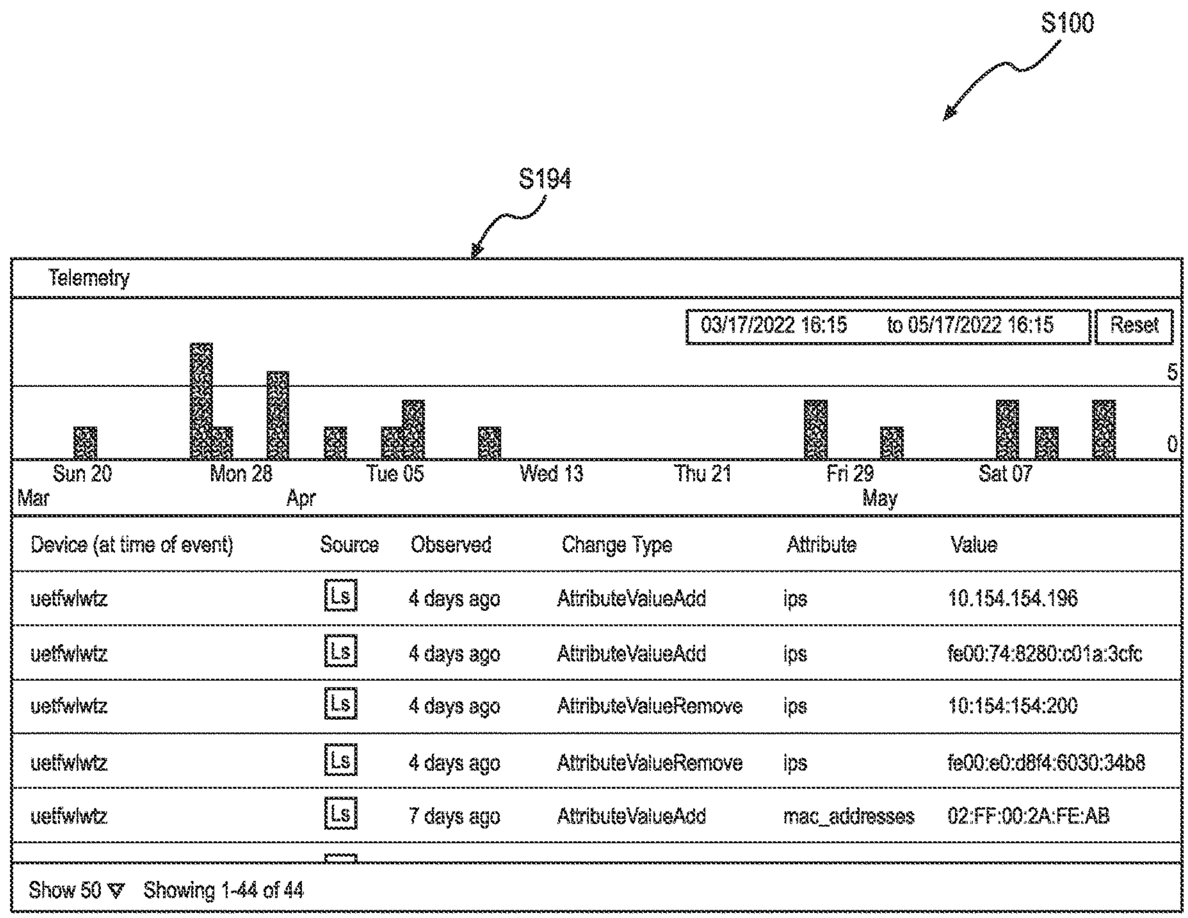
FIG. 7 is a graphical representation of one variation of the method.

Another variation the method S100 shown in FIGS. 6 and 7 includes: by a computer system, periodically polling a set of devices on a computer network in Block S110 and generating a manifest characterizing each of the devices including a state and a status of each device in Block S140. The method S100 can also include, for each device connected to the computer network: determining a change of state in Blocks S190 and S192; and determining a change of status in Block S196, S198. The method S100 can also include compiling, rendering, and presenting a visualization of a state of the network as a function of time for a set of devices connected to the network in Block S194.

In this variation, the method S100 also includes assembling a portfolio assessment for each period that includes a manifest of devices on the network or set of networks and an assessment of changes of state or changes of status for the devices on the manifest.

In this variation, the method S100 further includes, by the computer system, publishing a notification including changes of state and changes of status in Block S172, such as: periodically at set intervals; and/or in response to detecting trigger conditions, such as inventory changes, policy violations, changes in system status of a device (e.g., configuration of security tools, directory services, vulnerability management tools, etc.), or other device attribute changes indicative of abnormal behavior.

In this variation, the method S100 further includes, by the computer system, rendering and displaying a state and status of a device or the computer network in response to a search query in Block S194, such as: a snapshot or timeline assessment of the state and status of a device; or a snapshot or timeline assessment of the network of devices (or a selectable subset thereof).

2. Applications

Generally, a computer system (e.g., a local or remote computer system connected to or interfacing with a computer network) can execute Blocks of the method S100: to retrieve a set of objects (and/or registration logs, etc.) published by a set of security technologies designated for deployment on the computer network; to identify device correspondence between objects (e.g., based on fixed device identifiers and/or object times and); to fuse this device correspondence into a manifest containing one identifier for each endpoint device (e.g., a traditional computing device, computer, mobile device, IOT device, cloud infrastructure, etc. associated with one or more users) represented in at least one log in this set of logs; to label each device in the manifest with each security technology—in the set of security technologies—that published at least one object corresponding to the device; to repeat this process over time to generate a sequence of manifests that represent security tool (and other attribute) statuses of these endpoint devices; to detect changes in statuses of individual or groups of endpoint devices over time; to generate graphical visualizations depicting these changes; and to present these graphical visualizations to security personnel affiliated with the computer network.

More specifically, the computer system can execute Blocks of the method S100: to compile disparate logs and/or objects—published by various security technologies deployed on devices connected to the network—into one manifest that identifies all unique devices connected to the computer network during a target time interval (e.g., a past hour); and to label each unique device described in the manifest containing an accurate combination of security technologies executing on the device during the target time interval.

Additionally or alternatively, the computer system can execute Blocks of the method S100: to compile disparate logs and/or object—published by various productivity tools and/or other non-security technologies deployed on devices connected to the network—into the manifest; and to further label each unique device described in the manifest containing an accurate combination of productivity tool and/or non-security technologies executing on the device during the target time interval.

Additionally or alternatively, the computer system can: poll security technologies, productivity tools, other non-security technologies, and/or network devices directly for objects that contain endpoint device identifying and configuration data, such as hourly, daily, or when triggered by security personnel; and then execute Blocks of the method S100 to fuse these identifying and configuration data into a manifest containing an accurate combination of all endpoint devices connected to the computer system and their configurations during a current time interval.

The computer system repeats this process over time—such as hourly or daily—to generate a sequence of manifests representing configurations of these endpoint devices during discrete time intervals. Based on these manifests, the computer system can then: detect attribute changes in individual endpoint devices and across groups of endpoint devices; derive frequencies and velocities of such changes over time; detect alignment and deviation from a security policy specified for the computer network; generate graphical visualizations for individual endpoint devices and/or groups of endpoint devices based on these changes, frequencies and velocities of changes, and security policy statuses; and present these data and graphical visualizations to security personnel affiliated with the computer network.

For example, the computer system can compare these manifests to detect changes in individual endpoint devices across a set of attribute domains, such as: loss or addition of an address (e.g., a MAC address, an IP address, a host name) at the endpoint device; loss or addition of a user (e.g., login and logout events by discrete usernames) at the endpoint device; loss or addition of sources (e.g., security tools, productivity tools) detecting the endpoint device; and/or changes in location of the endpoint device (e.g., between on-premises and off-premises locations); etc. The computer system can then: generate a graphical visualization depicting these changes over time, such as in the form of a set of horizontal timelines, each corresponding to one attribute domain and annotated with times of corresponding attribute changes at the endpoint device; and render this graphical visualization within an operator portal.

In another example, the computer system can: access a security policy specifying a set of security tools required for installation on each endpoint device connected to the network; extract a security tool configuration of a particular endpoint device from each manifest; detect instances of alignment and deviation between the security tool configuration of the particular endpoint device and the set of security tools required by the security policy; generate a graphical visualization including a timeline annotated with periods of security policy alignment and periods of security policy deviation at the particular endpoint device; and render this graphical visualization within an operator portal.

In another example, the computer system can: derive security tool configuration and other attribute change events within a population of endpoint devices during discrete time intervals (e.g., daily) based on objects published by these security tools; calculate a frequency of such change events within each time interval; derive trends in such change event frequencies over time (e.g., highest frequency of change events on Mondays, diminishing over subsequent business days, with lowest frequency of change events on Sundays); generate a graphical visualization (e.g., a histogram) depicting frequencies of such change events per time interval; and render this graphical visualization within an operator portal. The computer system can also flag a time interval containing a frequency of change events that deviates from this trend, generate a list of endpoint devices affiliated with these excess change events, and generate a prompt to investigate these endpoint devices for increased security threats.

Furthermore, the organization may have an interest in understanding changes in its inventory of assets over time, including operation of ancillary network-based services such as: configuration management database (CMDB) services; security information and event management (SIEM) services and investigations; vulnerability management services; professional services automation (PSA) for managed security service provider (MSSP) services; and/or accounting and financial management best practices and compliance (e.g., compliance with GAAP accounting principles for asset depreciation). Therefore, the computer system can execute Blocks of the method S100 to: detect all endpoint devices connected to the computer network, such as within a target time interval; detect security technology (and productivity tool, etc.) configurations of these endpoint devices; compile these data into a manifest representing a comprehensive inventory of endpoint devices connected to the computer network during the target time interval; generate additional similar manifests over time; detect change events at individual endpoint devices over time based on differences between these manifests; and translate these differences into alerts, graphical visualization, and/or other formats that target such interests of the organization.

2.1 Manifest Comparison

In particular, the computer system can execute Blocks of the method S100 to: identify, categorize, and present changes in the devices connected to the computer network over time. More specifically, the computer system can execute Blocks of the method S100 to identify and categorize—for each device on the computer network—changes in state (e.g., whether the device is provisioned or deprovisioned) and changes in status (e.g., whether the device is running the recommended operating system, changes in host name, IP address, domain, MAC address, operating system, operating system version/patch, username, etc.) as a function of time such that the computer system can readily determine an historical (and likely present) compliance level of the devices on the computer network. The computer system can execute Blocks of the method S100 to normalize and compare the first manifest and a second manifest (assembled at a second time) to generate a comparative manifest indicative of the historical behavior of the devices, including changes in state, status, and potentially anomalous device or user behavior. Additionally, the computer system can execute Blocks of the method S100 to generate, render, and display snapshot or timeline views of devices on the computer network to an operator interfacing with the computer system through an operator portal.

The operator portal (e.g., executing on a local device) can then execute Blocks of the method S100 to: render a user interface; publish a menu identifying devices and/or users; and receive selection of a timeline or snapshot view of a device and/or user history from an operator (e.g., a security analyst, a network administrator). The operator portal (or the computer system) can then query a comparative manifest to determine, for each selected device or user, a timeline of the changes (both state and status) of the selected device. The operator portal (or the computer system) can further bound its query based upon a selected time frame or time interval.

Generally, the computer system and the operator portal are described herein as executing Blocks of the method S100 to characterize and visualize (real-time, historical) security technology deployment efficacy across devices connected to the computer network based on logs, internal data, and/or databases published by these security technologies. Furthermore, the computer system and/or the operator portal can execute Blocks of the method S100 to: call application programming interfaces (or "APIs") hosted by these security technologies (or "sources") for objects detected by these security technologies; fuse objects returned by these security technologies; and then characterize and visualize security technology deployment efficacy across devices connected to the computer network accordingly.

Furthermore, the computer system and the operator portal can execute Blocks of the method S100 to characterize and visualize security technology deployment efficacy across all computing resources owned by an organization (e.g., laptop computers and printers own by the organization and provided to employees) or computing devices accessing resources supplied by the organization (e.g., personal smartphones accessing virtual drives or email accounts owned by the organization; personal computing devices connecting to organization resources through VPN). Similarly, the computer system and the operator portal can execute Blocks of the method S100 to characterize and visualize security technology deployment efficacy across all computing resources connected to a singular physical computer network or connected to or accessing organization resources through any one or more affiliated or unaffiliated computer networks over time.

The computer system and the operator portal can additionally or alternatively execute Blocks of the method S100 to characterize and visualize deployment efficacy of a suite of technology types, such as traditional internet technology tools, authentication platforms, Cloud/SaaS applications, endpoint security technologies, firewalls, etc. The computer system and the operator can also simultaneously execute the process to derive and visualize time-based compliance of network and endpoint devices on the computer network.

2.2 Terms

The computer system and the operator portal are described herein as executing Blocks of the method S100 to characterize and visualize (real-time, historical) security technology deployment efficacy across devices connected to the computer network based on logs published by these security technologies. Additionally or alternatively, the computer system and/or the operator portal can execute Blocks of the method S100 to: call application programming interfaces (or "APIs") hosted by these security technologies (or "sources") for objects detected by these security technologies; fuse objects returned by these security technologies; and then characterize and visualize security technology deployment efficacy across devices connected to the computer network accordingly.

Furthermore, the computer system and the operator portal can execute Blocks of the method S100 to characterize and visualize security technology deployment efficacy across all computing resources owned by an organization (e.g., laptop computers and printers own by the organization and provided to employees) or computing devices accessing resources supplied by the organization (e.g., personal smartphones accessing virtual drives or email accounts owned by the organization; personal computing devices connecting to organization resources through VPN). Similarly, the computer system and the operator portal can execute Blocks of the method S100 to characterize and visualize security technology deployment efficacy across all computing resources connected to a singular physical computer network or connected to accessing organization resources through any one or more affiliated or unaffiliated computer networks over time.

The computer system and the operator portal can additionally or alternatively execute Blocks of the method S100 to characterize and visualize deployment efficacy of a suite of technology types, such as traditional internet technology tools, authentication platforms, Cloud/SaaS applications, endpoint security technologies, firewalls, etc.

2.2 Example

For example, a security policy for the computer network can specify deployment of a first endpoint security technology and a second endpoint security technology (hereinafter "security technologies") on all endpoint devices connected to the computer network.

At a given time, the first security technology may be deployed on a first quantity of endpoint devices connected to the computer network, and an operator may interpret this first quantity of endpoint devices from objects published by the first security technology. Similarly, for this same time, the second security technology may be deployed on a second quantity of endpoint devices connected to the computer network, and the operator may interpret this second quantity of endpoint devices from objects published by the second security technology. The operator may assume that all endpoint devices connected to the network are properly configured with the first and second security technologies if the first and second quantities are identical. However, some endpoint devices in the first quantity may be configured with the first security technology only, and some endpoint devices in the second quantity may be configured with the second security technology only. Similarly, if the first and second quantities differ by a first difference, the operator may incorrectly assume that only this first difference of endpoint devices are incorrectly configured.

Furthermore, the operator may estimate a total quantity of endpoint devices connected to this computer network at this time based on the greater of the first and second quantities. However, the true quantity of endpoint devices connected to the computer network at this time may be (much) greater that the greater of the first and second quantities if each of the first and second security technologies are deployed on only subsets of the total quantity of endpoint devices connected to the network at this time.

Furthermore, employees, personnel, guests, and other affiliates of the organization (hereinafter "users") may frequently: be hired and assigned new computing devices; be terminated; leave and return to the organization campus throughout their computing devices each day or over longer time periods with their endpoint devices; and/or connect organization-related and personnel devices to the computer network over time. Therefore, the total quantity of endpoint devices connected to the computer network may change frequently (e.g., per minute, hour, or day) and may differ (significantly) from the operator's last estimated total quantity of endpoint devices affiliated with the computer network.

Therefore, the computer system can execute Blocks of the method S100 to: identify a first set of endpoint devices connected to the computer network and on which the first security technology is deployed during a target time interval based on objects published by the first security technology during this target time interval; identify a second set of endpoint devices connected to the computer network and on which the second security technology is deployed during this target time interval based on objects published by the second security technology during this target time interval; identify an intersection and disjoints of these sets of endpoint devices based on similar and dissimilar identifiers and features contained in these objects; and then derive deployment efficacy metrics for the first and second security technologies based on the intersection and these disjoints, including accurate quantities of endpoint devices on which only one and both of the first and second security technologies are deployed.

The computer system can further repeat this process to derive deployment efficacy metrics for the first and second security technologies over time and to detect changes in deployment efficacy of the first and second security technologies, such as: groups of endpoint devices on which both security tools are deployed; groups of endpoint devices on which only one of the security tools is deployed; groups of endpoint devices on which neither security tool is deployed; rates of change in group sizes; and/or trends or pattern times and magnitudes of changes in these groups; etc.

The operator portal can then present these deployment efficacy metrics for the first and second security technologies to the operator in a visualization (e.g., timelines of sizes and change rates of these groups; plots of sizes of these group over time) that enables the operator to quickly ascertain: accurate quantities of endpoint devices that are and are not properly configured according to the security policy over time; and how alignment with the security policy changes across devices within the computer network over time (or security policy "flow").

The computer system and the operator can also simultaneously execute the process to derive and visualize deployment efficacy metrics for (many) more security technologies designated by the security policy.

Furthermore, the computer system and the operator portal can execute Blocks of the method S100 to: generate a manifest of endpoint devices and the security technology configurations; ingest a security policy for the computer network; detect deviations from the security policy in configurations of a subset of these endpoint devices; compare the frequency or distribution of these security policy deviations to past security policy deviation trends; and selectively prompt security personnel to investigate (e.g., reconfiguration, quarantine) this subset of endpoint devices if the frequency or distribution of these security policy deviations deviates from historical trends at the computer network, which may indicate increased risk to the computer network or an in-process attack on the computer network.

3. Computer Network and Devices

Generally, various assets (or "devices") may connect to an organization's computer network over time, such as: network devices, including hubs, switches, routers, bridges, gateways, modems, repeaters, and/or access points; and endpoint devices (or "agents"), including workstations, laptops, smartphones, printers, mobile kiosks, smartwatches, and/or printers.

4. Organization and Security Policy

Generally, a security policy for the organization may specify deployment of a suite of security technologies on devices connected to the network, such as: network security technology (e.g., firewalls, sensors); and endpoint security technologies (e.g., anti-virus and anti-malware tools). For example, the security policy may specify a suite of endpoint security technologies for: all endpoint devices; a subset of endpoint devices executing a particular operating system; a subset of endpoint devices of a particular type (e.g., printer, workstation, smartphone); and a subset of endpoint devices operated by a particular set of users or user class.

Furthermore, the security policy may specify that certain configurations or capabilities of an endpoint device (e.g., wireless communications) be deactivated during certain times or when the endpoint device is otherwise connected to the computer network (e.g., through a wired port). Similarly, the security policy may specify that a suite of network security technologies be deployed and active on the computer network via network devices.

Additionally or alternatively, the security policy may specify that installation or operation of certain productivity tools (e.g., a word processor, a desktop email client) onto an endpoint device be paired with a particular security technology and/or a particular security technology configuration.

5. Security Technologies and Objects

Block S110 of the method S100 recites accessing a set of objects published by a set of security technologies designated for deployment on a computer network. Block S120 of the method S100 recites partitioning the set of objects into a set of object groups, each object group in the set of object groups including a sequence of objects recorded by a security technology, in the set of security technologies, involving one endpoint device, in a set of endpoint devices, connected to the computer network during a target time interval.

As shown in FIGS. 1B and 3A, each endpoint security technology and/or network technology may publish device and network objects for each device on which the security technology is deployed and active, such as: automatically on a regular interval; when endpoint devices connect to and disconnect from the network; and/or when called by the computer system (e.g., via API). For example, when deployed on endpoint devices connected to the computer network, an endpoint security technology can populate registration objects, each containing: a device name internal to the security technology; a MAC address of the endpoint device; a current IP address of the endpoint device; a username or user identifier of a user logged into the endpoint device; an operating system of the endpoint device; a security policy configuration of the security technology at the endpoint device; a registration time of the security technology at the endpoint device; and/or a registration removal time of the security technology at the endpoint device; etc.

In another example, a security technology can generate these objects, and the computer system can call these objects via an application programming interface (API). Accordingly, the computer system can: ingest objects containing log events streamed by a first security technology—deployment on the computer network—for endpoint devices configured with the first security technology during a current time interval in Block S110; and repeat this process to aggregate objects from logs published by each other security technology deployed on the network during the current time interval. Then, in response to conclusion of the current time interval, the computer system can execute subsequent Blocks of the method S100 to identify subsets of endpoint devices that exhibit identical security technology configurations during this time interval based on objects collected from logs published by these security technologies during this time interval.

Additionally or alternatively, the endpoint security technology can populate an object log with log objects, each log object containing: a device name internal to the security technology; a MAC address of the endpoint device; a current IP address of the endpoint device; a username or user identifier of a user logged into the endpoint device; an operating system of the endpoint device; a time that the endpoint device connected to or disconnected from the computer network; an inbound packet size and sender identifier; an outbound packet size and recipient identifier; a packet communication protocol; and/or a timestamp; etc. Accordingly, the computer system can: access one or more logs published by each endpoint security technology designated in the security policy in Block S110; and extract a target set of objects published or containing timestamps within a target time interval—described below—from each of these logs in Block S120.

5.1 Direct Device Polling

In one variation, the computer system periodically directly polls a set of devices connected to the computer network for objects representing status of these devices.

Generally, a device connected to the computer network—or a security technology installed on the device—may generate or publish device and network objects (e.g., device and network logs) unique to the device. For example, when a device connects to the computer network, an endpoint security technology deployed on the device may generate registration objects for the device, such as including: a fully-qualified domain name (FQDN); an international mobile equipment identity (IMEI) designation; a universal unique identifier (UUID) associated with the device; a device name internal to the endpoint device security technology; a MAC address of the endpoint device; a current IP address of the endpoint device; a username or user identifier of a user logged into the endpoint device; an operating system of the endpoint device including operating system version and/or patch level; a security policy configuration of the security technology at the endpoint device; a registration time of the security technology at the endpoint device; and/or a registration removal time of the security technology at the endpoint device.

The device can then store these registration objects in local memory. Accordingly, the computer system can directly poll these registration objects from the device.

5.2 Security Technology Polling Via API

Alternatively, the computer system can call security technologies—operating on devices connected to the computer network—for objects via application programming interfaces (APIs), as shown in FIG. 3A. For example, an endpoint security technology may populate an object log with log objects, each containing: a device name internal to the security technology; a MAC address of the endpoint device; a current IP address of the endpoint device; a username or user identifier of a user logged into the endpoint device; an operating system of the endpoint device; a time that the endpoint device connected to or disconnected from the computer network; an inbound packet size and sender identifier; an outbound packet size and recipient identifier; a packet communication protocol; active or inactive ports, modems, or transceivers; a timestamp associated with the object log; a security protection/detection status; an agent version; and/or configuration.

5.3 Network Polling Via API

In another implementation shown in FIG. 3A, the computer system implements direct network scanning via SMTP or DHCP protocols directed at the entire network.

In a similar implementation, the computer system implements network scanning protocols (SNMP) and/or a DHCP plug-in configured to infer attributes of the device and/or device network objects from DHCP server(s). For example, the computer system can execute these methods and techniques in place of or in addition to directly polling devices and/or polling security technologies deployed on these devices.

5.4 Object Variance

Therefore, the computer system can collect objects directly or indirectly from devices, security technologies, and/or the computer network, such as via API from object logs published by these entities.

However, content of these object logs and/or these objects may differ for different types of devices (e.g., network device or endpoint device), device usage, and/or applications deployed on these devices at time of polling. For example, content of the object log and associated log objects may vary by type of security technology reporting status on a particular device, such as based on depth and breadth of reporting ability of the security technology. In this example, a threat-specific endpoint security technology may report narrowly on its operational status at an endpoint device; and an endpoint security technology configured to detect a broad range of attack types may report on its operational status on an endpoint device and the operational status of the endpoint device more generally, such as whether the endpoint device has unattended ports or disabled encryption.

Therefore, the computer system can execute Blocks of the method S100 to reconcile identifying data contained in these objects collected from these disparate sources.

5.5 Polling Interval

Generally, the computer system can execute Blocks of the method S100 to periodically poll devices, security technologies, and/or the computer network over time, such as on a predefined time interval of once per hour or once per day.

Additionally or alternatively, the computer system can periodically poll subsets of devices and/or security technologies on the computer network at rolling intervals such that: the computer system collects objects substantially continuously throughout a polling interval; and each device and/or security technology responds to poll requests from the computer system only once per time interval.

In another implementation, the computer system polls security technologies substantially concurrently, such that objects published by different security technologies represent each device in the same configuration, of the same status, and of the same characteristics. More specifically, because the configuration, status, and characteristics of a device may change over time and because the computer system leverages common device configurations, statuses, and characteristics to reconcile objects from different security technologies, the computer system can poll objects from all security technologies on the computer network approximately concurrently in order to reduce opportunity for object configuration, status, and characteristics changes that may reduce correspondence between objects generated by different security technologies for the same device and thus introduce object reconciliation error.

Alternatively, the computer system: polls a first endpoint security technology across all endpoint devices on the network on a first time interval; polls a second endpoint security technology across all endpoint device on a second time interval, and polls a third endpoint security technology across all endpoint devices on a third time interval. In this implement, the first time interval, the second time interval, and the third time interval can overlap, but non-coincide, such that the computer system receives objects from these security technology substantially continuously.

6. Device Inventory Unification within Security Technologies

Block S130 of the method S100 recites, for each object group, aggregating objects in the object group into an endpoint device container (e.g., a "virtual container") including fixed identifying data and variable status data representative of one endpoint device in the set of endpoint devices in Block S130, the endpoint device container stored in a set of endpoint device containers associated with the security technology. Generally, in Block S130, the computer system can consolidate a target set of objects (or "events") for a security technology into object groups, wherein each object group corresponds to one endpoint device and contains one or more log objects involving the endpoint device and detected by the security technology during the target time interval, as shown in FIGS. 1B and 3B.

In one implementation, the computer system scans a first target set of objects—associated with a first security technology—for unique internal device identifiers assigned to endpoint devices by the first security technology. Then, for a first unique internal device identifier, the computer system can: isolate a object group containing this internal device identifier; extract fixed identifying data (e.g., MAC address, operating system) from this object group; and extract timeseries object-based identifying data from this object group. For example, the computer system can extract and aggregate timeseries object-based identifying data from this object group to generate: a first timeseries of IP addresses; a second timeseries of inbound data packets, including size and source IP address; a third timeseries of outbound data packets, including size and destination IP address; a fourth timeseries of login usernames; a fifth timeseries of network connection and disconnection instances by the endpoint device; a sixth timeseries of detected threats at the endpoint device; a seventh timeseries of security policy configurations at the endpoint device; etc. (Alternatively, the computer system can store extract single-point values in these domains from the object group.) The computer system can then compile these fixed and object-based data into one endpoint device container associated with the first unique internal device identifier.

The computer system can then repeat this process for each other unique internal device identifier represented in the first target set of objects published by the first security technology in order to generate a first set of endpoint device containers associated with the first security technology. Therefore, the computer system can consolidate the first target set of objects—published by the first security technology during the target time interval—into one representation of fixed and object-based device identifiers for each unique endpoint device on which the first security technology is installed.

The computer system can then repeat this process for each other security technology in order to generate a set of endpoint device containers associated with each security technology designated by the security policy.

Additionally or alternatively, rather than poll a security technology for log objects and then fuse these log objects into a group of unique objects in Block S130, the computer system can poll the security technology directly for this object group (e.g., via API call) and then aggregate these objects into an endpoint device container for the security technology. (The computer system can implement similar methods and techniques to generate or aggregate endpoint device containers for other technologies executing on or accessed by these endpoint devices, such as including authentication platforms, network tools, and/or Cloud/SaaS applications.)

7. Device Inventory Unification Across Security Technologies

Blocks S140 and S150 of the method S100 recite, based on fixed identifying data and variable status data contained in endpoint device containers in the set of endpoint device containers associated with the set of security technologies: generating a manifest (or "aggregation") of endpoint devices connected to the computer network during the target time interval; and labeling each endpoint device in the manifest of endpoint devices with a combination of security technologies, in the set of security technologies, deployed on the set of endpoint devices during the target time interval. Generally, in Block S140 and S150, the computer system can fuse endpoint device container—derived from isolated, internal logs published by disconnected security technologies—into one manifest identifying all unique endpoint devices connected to the computer network during the target time interval and the particular combinations of security technologies that detected each unique endpoint device during the target time interval, as shown in FIG. 3B.

7.1 Unification by Similarity Score

In one implementation shown in FIG. 1B, the computer system: calculates similarities between endpoint device containers across all security technologies designated in the security policy; and identifies groups of endpoint device containers that correspond to the same endpoint devices based on fixed and object-based features stored in these endpoint device containers.

In particular, in this implementation, the computer system: select a first endpoint device container associated with a first security technology; select a second endpoint device container associated with a second security technology; extract a first set of values in a first domain (e.g., MAC addresses) from the first and second endpoint device containers; calculate a similarity score between this first set of values in the first domain (e.g., 1.0 if these MAC addresses are identical; 0.5 if these MAC addresses are different but similar; 0.01 if these MAC addresses are very dissimilar); extract a second set of values in a second domain (e.g., inbound data packets) from the first and second endpoint device containers; calculate a similarity score between this second set of values in the second domain (e.g., 1.0 if these values indicate receipt of data packets at the same ports, of very similar sizes, and at very similar times; 0.01 in the inbound data packet domain if the first and second endpoint device containers indicate receipt of data packets at different ports, of different sizes, and at different times); and repeat this process for each other domain represented in both the first and second endpoint device containers.

The computer system can then compile these similarity scores into one composite similarity score representing similarity between the first and second endpoint device containers across all domains represented in both the first and second endpoint device containers. For example, when compiling these similarity scores, the computer system can implement different weights for each domain, such as: a weight of 1.0 for MAC address similarity scores; a weight of 0.9 for operating system similarity scores; a weight of 0.8 for concurrent IP address similarity scores; a weight of 0.5 for concurrent username login similarity scores; a weight of 0.3 for concurrent outbound data packet similarity scores; and/or a weight of 0.2 for concurrent inbound data packet similarity scores; etc. In this example, the computer system can then: multiply each similarity score between the first and second endpoint device containers by its corresponding weight; calculate a sum of these weighted similarity scores; and store the sum as the composite similarity score between the first and second endpoint device containers.

The computer system can then repeat this process to generate a first set of composite similarity scores that represent similarities between the first endpoint device container and each other endpoint device container associated with the second security technology.

The computer system can then identify highest composite similarity score in this first set of composite similarity scores. If this highest composite similarity score—between the first endpoint device container associated with the first security technology and a second endpoint device container associated with the second security technology—exceeds a threshold score, the computer system can: identify these endpoint device containers as corresponding to the same endpoint device; and confirm that both the first and second security technologies are active on this endpoint device during the target time interval. Accordingly, the computer system can: write a first unique endpoint device identifier for this endpoint device to the manifest; and label the first endpoint device identifier with identifiers of both the first and second security technologies. The computer system can also store additional characteristics of the first endpoint device—derived from the first and second endpoint device containers—in the manifest, such as: security policy configurations of the first and second security technologies at the first endpoint device; an operating system of the first endpoint device; a device type (e.g., laptop computer, smartphone) of the first endpoint device; registration times for the first and second security technologies at the first endpoint device; a last network connection time for the first endpoint device; a username logged into the first endpoint device; inbound and outbound traffic size and frequency; etc.

Otherwise, if this highest composite similarity score—between the first endpoint device container associated with the first security technology and any endpoint device container associated with the second security technology—falls below the threshold score, the computer system can: determine that the second security technology is not deployed on the first endpoint device or was otherwise not active during the target time interval; and label the first endpoint device identifier in the manifest with an identifier of the first security technology only. The computer system can also store additional characteristics of the first endpoint device—derived from the first endpoint device container only—first endpoint device identifier in the manifest.

The computer system can then: repeat this process for each other endpoint device container associated with a third security technology designated by the security policy in order to calculate a second set of composite similarity scores that represent similarities between the first endpoint device container and each endpoint device container associated with the third security technology; and identify a highest composite similarity score in this second set of composite similarity scores. If this highest composite similarity score—between the first endpoint device container associated with the first security technology and a third endpoint device container associated with the third security technology—exceeds the threshold score, the computer system can: further label the first endpoint device identifier in the manifest with an identifier of the third security technology; and store additional characteristics of the first endpoint device—derived from the second endpoint device container—with the first endpoint device identifier in the manifest. (The computer system can also verify that a composite similarity score between the second and third endpoint device containers exceeds the threshold similarity score before labeling the first endpoint device identifier with the identifier of the third security technology.)

The computer system can then repeat this process for each other security technology designated by the security policy in order to: identify endpoint device containers—associated with these other security technologies—that correspond to the same endpoint device as the first endpoint device container; and update the manifest accordingly.

The computer system can then repeat this process for each other endpoint device container associated with the first security technology in order to: identify endpoint device containers—associated with these other security technologies—that correspond to the same endpoint devices represented in the first set of endpoint device containers associated with the first security technology; and update the manifest accordingly.

The computer system can then repeat this process for each other security technology to: identify and/or validate correspondence between endpoint device containers associated with all security technologies designated by the security policy; and update the manifest accordingly.

7.1.1 Example

In particular, the computer system can: identify a first subset of endpoint devices configured with both a first security technology and a second security technology in Block S140 based on correspondence between data (e.g., fixed identifying data and variable status data) contained in a first subset of endpoint device containers associated with the first security technology and a second subset of endpoint device containers associated with the second security technology; and similarly identify a second subset of endpoint devices configured with a first security technology and not the second security technology in Block S140 based on lack of correspondence between data (e.g., fixed identifying data and variable status data) contained in a third subset of endpoint device containers associated with the first security technology and a fourth subset of endpoint device containers associated with the second security technology.

For example, during a current time interval, the computer system can: retrieve a first endpoint device container associated with the first security technology; retrieve a second endpoint device container associated with the second security technology; retrieve a third endpoint device container associated with the first security technology; and retrieve a fourth endpoint device container associated with the second security technology. The computer system then calculates a first correspondence score for the first endpoint device container and the second endpoint device container based on: similarities of fixed identifying data stored in the first endpoint device container and the second endpoint device container; and similarities of concurrent variable status data stored in the first endpoint device container and the second endpoint device container. Then, in response to this first correspondence score exceeding a threshold correspondence score, the computer system can: identify the first endpoint device container and the second endpoint device container as corresponding to a single (e.g., a first) endpoint device; and compile fixed identifying data and variable status data contained in the first endpoint device container and the second endpoint device container into a single (e.g., a first) representation of the first endpoint device during the current time interval.

Similarly, the computer system can calculate a second correspondence score for the third endpoint device container and the fourth endpoint device container based on: similarities of fixed identifying data stored in the third endpoint device container and the fourth endpoint device container; and similarities of concurrent variable status data stored in the third endpoint device container and the fourth endpoint device container. Then, in response to the second correspondence score falling below the threshold correspondence score, the computer system can: identify the third endpoint device container as corresponding to a second endpoint device distinct from a third endpoint device represented by the fourth endpoint device container; and compile fixed identifying data and variable status data contained in the third endpoint device container—and excluding fixed identifying data and variable status data contained in the fourth endpoint device container—into a second representation of the second endpoint device during the current time interval.

7.1.2 Repolling

In one variation shown in FIG. 3B, the computer system: polls objects directly from the set of security technologies at a first frequency during the first time interval, such as via API calls; and selectively repolls security technologies for additional objects if a correspondence between endpoint device containers associated with two different security technologies fall within an intermediate correspondence range. In particular, the computer system can set and/or implement an intermediate correspondence range: that indicates the endpoint device containers may correspond to the same endpoint device; that indicates differences are present between these endpoint device containers; and that these differences may be due to a change status of the same endpoint device over a time between polling or publication of objects by these security technologies.

For example, the computer system can: poll objects from the set of security technologies during the current time interval at a first polling frequency; retrieve a first endpoint device container associated with the first security technology; and retrieve a second endpoint device container associated with the second security technology. The computer system then calculates a first correspondence score for the first endpoint device container and the second endpoint device container based on: similarities of fixed identifying data stored in the first endpoint device container and the second endpoint device container; and similarities of concurrent variable status data stored in the first endpoint device container and the second endpoint device container.

Then, in response to the first correspondence score falling within an intermediate correspondence range, the computer system can: repoll objects from the set of security technologies at a second polling frequency—greater than the first polling frequency—during a next time interval; update the first endpoint device container based on objects received from the first security technology during the second time interval; update the second endpoint device container based on objects received from the second security technology during the second time interval; and calculate a revised correspondence score for the first endpoint device container and the second endpoint device container.

Then, in response to the revised correspondence score exceeding the intermediate correspondence range, the computer system can: identify the first endpoint device container and the second endpoint device container as corresponding to the same (e.g., a first) endpoint device; and compile fixed identifying data and variable status data contained in the first endpoint device container and the second endpoint device container into a first representation of the first endpoint device during the current time interval.

Conversely, in response to the revised correspondence score falling below the intermediate correspondence range, the computer system can: identify the first endpoint device container as corresponding to a first endpoint device distinct from a second endpoint device represented by the second endpoint device container; and compile fixed identifying data and variable status data contained in the first endpoint device container—and excluding fixed identifying data and variable status data contained in the second endpoint device container—into a representation of the first endpoint device during the current time interval.

7.2 Similarity Matrix

In a similar implementation, the computer system implements similar methods and techniques to: compare domain-specific values contained in endpoint device containers associated with the set of security technologies; generate a matrix of similarities between each endpoint device container and the endpoint device containers associated with each other security technology in the set; and identify groups of endpoint device containers—across multiple security technologies—that correspond to the same endpoint devices based on these similarity scores. In this implementation, the computer system can then: populate a manifest with one unique endpoint device identifier for each group of endpoint device containers; label each unique endpoint device identifier with an identifier of each security technology represented in its corresponding group of endpoint device containers; and store or link other characteristics from these groups of endpoint device containers with their corresponding unique endpoint device identifiers in the manifest.

7.2 Unification by Machine Learning

In yet another implementation, the computer system can implement machine learning and/or regression techniques to compare endpoint device containers—associated with multiple security technologies—across multiple domains and to identify groups of endpoint device containers that correspond to the same endpoint devices. The computer system can then generate a manifest or other record of these unique endpoint devices and the security technologies deployed on these endpoint devices based on these groups of endpoint device containers.

7.4 Data Aggregation

The computer system then compiles fixed identifying data and variable status data contained in a set of endpoint device containers—containing objects published by different security technologies but identified by the computer system as corresponding to the same endpoint device—into a composite (or "singular") container representing of the endpoint device during the current time interval.

In one example, the computer system: identifies a first endpoint device container associated with a first security technology and a second endpoint device container associated with as second security technology as corresponding to a singular endpoint device; extracts a first Internet Protocol value from the first endpoint device container; extracts a second Internet Protocol value from the second endpoint device container; and compiles the first Internet Protocol value and the second Internet Protocol value into a normalized Internet Protocol value of the first endpoint device based on stored Internet Protocol address handling characteristics of the security technologies. In this example, the computer system can also: extract an operating system identifier from the first endpoint device container (which may not be captured in objects published by the second security technology); and extract a user identifier from the second endpoint device container (which may not be captured in objects published by the first security technology). The computer system can then compile the normalized Internet Protocol value, the operating system identifier, the user identifier, a first identifier of the first security technology, and a second identifier of the second security technology, etc. into the first representation of the first endpoint device during the current time interval.

7.5 Aggregation and Manifest

As shown in FIG. 1B, the computer system can execute Block S140 of the method S100 to generate a manifest of devices including a state and a status of each device. Generally, the computer system can execute Block S140 of the method S100 to aggregate objects in the group of objects into an endpoint device container (e.g., a "virtual container")—including fixed identifying data and object-based identifying data representative of one endpoint device in the set of endpoint devices—for each group of objects. Generally, in Block S140, the computer system can consolidate a target set of objects (or "events") for a security technology into groups of objects, wherein each group of objects corresponds to one endpoint device and contains one or more log objects involving the endpoint device and detected by the security technology during the polling event of Block S110.

In one implementation, the computer system scans a first target set of objects—associated with a first security technology—for unique internal device identifiers assigned to endpoint devices by the first security technology. Then, for a first unique internal device identifier, the computer system can: isolate a group of objects containing this internal device identifier; extract fixed identifying data (e.g., MAC address, operating system) from this group of objects; and extract timeseries object-based identifying data from this group of objects. For example, the computer system can extract and aggregate timeseries object-based identifying data from this group of objects to generate: a first timeseries of IP addresses; a second timeseries of inbound data packets, including size and source IP address; a third timeseries of outbound data packets, including size and destination IP address; a fourth timeseries of login usernames; a fifth timeseries of network connection and disconnection instances by the endpoint device; a sixth timeseries of detected threats at the endpoint device; a seventh timeseries of security policy configurations at the endpoint device; etc. (Alternatively, the computer system can store extracted single-point values in these domains from the group of objects.) The computer system can then compile these fixed and object-based data into one endpoint device container associated with the first unique internal device identifier.

The computer system can then repeat this process for each other unique internal device identifier represented in the first target set of objects published by the first security technology in order to generate a first set of endpoint device containers associated with the first security technology. Therefore, the computer system can consolidate the first target set of objects—published by the first security technology during the polling event of Block S110—into one representation of fixed and object-based device identifiers for each unique endpoint device on which the first security technology is installed.

The computer system can then repeat this process for each other security technology (or network, information technology infrastructure, cloud-based platform, software-as-a-service platform, etc.) to generate a set of endpoint device containers associated with each security technology designated by the security protocol.

Alternatively, rather than poll a security technology for log objects and then fuse these log objects into a group of unique objects in Block S120, the computer system can poll the security technology directly for this group of objects (e.g., via API call) and then aggregate these objects into an endpoint device container for the security technology. The computer system can implement similar methods and techniques to generate or aggregate endpoint device containers for other technologies executing on or accessed by these endpoint devices, such as including authentication platforms, network tools, and/or Cloud/SaaS applications.

7.5.1 Normalization

In one variation, the computer system can execute Blocks of the method S100 to normalize the state and status of each endpoint device. Generally, each security technology that responds to a polling query from the computer system can provide a response with a unique or proprietary data format representing the object. Accordingly, as each endpoint device can have multiple security technologies, a comprehensive report of the state and status of the endpoint device can include object data in various formats. Therefore, the computer system can execute Blocks of the method S100 to normalize or standardize the data format and/or content for each security technology responding to polling by the computer system.

For example, a first security technology can respond to a poll by indicating that the endpoint device is running an operating system "OS.10.5.9" and with an IP address denoted "IP101.23.213.1." A second security technology can respond to the same poll by indicating that the endpoint device is running an operating system "WIN.OS.10v5.9" and an IP address denoted "IP_address_101.23.213.1." In this example, the security technologies are reporting identical configurations for the endpoint device, but in an inconsistent format and lexicon. Accordingly, the computer system can execute Blocks of the method S100 to normalize both states (e.g., IP addresses) and statuses (e.g., operating systems) for each security technology response for each endpoint device.

Generally, the computer system S100 can convert each log object into a standardized or consistent format such that a resulting manifest characterizing the endpoint devices is complete and consistent. Similarly, the computer system can execute Blocks of the method S100 to normalize and standardize empty or nonce fields reported by various security technologies to properly reflect a null or non-existent value for certain attributes or objects.

8. Other Endpoint Device Technologies

Furthermore, the computer system and the operator portal can additionally or alternatively execute Blocks of the method S100 to derive efficacy metrics for tools and software technologies deployed on endpoint devices connected to the network, such as: team communication software; work processors; and/or software development tools; etc.

More specifically, the computer system can implement similar methods and techniques described above to poll these non-security technologies, endpoint devices, and/or the network—such as via APIs—for objects representing deployment, status, and/or configuration of these technologies and endpoint devices. The computer system can then fuse and reconcile these objects into a comprehensive inventory of endpoint devices connected to the network, including whether security technologies and these other technologies are installed on these endpoint devices and their configurations, as shown in FIG. 3A.

For example, the computer system can: access a second set of objects generated by a productivity tool during the current time interval and representing characteristics of a subset of endpoint devices, in the set of endpoint devices, configured with the security technology; and partition the second set of objects into a second set of object groups in Block S120, wherein each object group in the second set of object groups represents statuses of an endpoint device during the current time interval. Then, for each object group in the second set of object groups, the computer system can aggregate characteristics represented in objects in the object group into an endpoint device container—in a second set of endpoint device containers—associated with the productivity tool and containing fixed identifying data and variable status data representing an endpoint device in the subset of endpoint devices in Block S130.

9. Network Activity

Generally, over time, users may connect devices—not installed with any security technology designated by the security policy—to the computer network, such as personal smartphones and smartwatches. Therefore, execute of the method S100 as described above based on logs published by security technologies may expose all endpoint devices with at least one security technology installed but may fail to detect such endpoint device with none of these security technologies installed.

Therefore, in one variation, the computer system implements similar methods and techniques: to access a network activity log—generated by one or more network device security technologies (e.g., a firewall, a network sensor)—representing network objects involving devices connected to the computer network during the target time interval; and to compile these network objects into a set of network-based endpoint device containers. For example, the computer system can access a network activity log populated with a sequence of alerts, each containing: a timestamp; a sender (or "source") IP address; a sender port; a recipient (or "destination") IP address; a recipient port; a communication protocol; and a packet size (or "length"); etc. The computer system can then implement methods and techniques described above to compile these alerts into a set of endpoint device containers, each including: an IP address of an endpoint device within the computer network; and transient communication-related identifiers (e.g., timestamps, ports, destination or source IP addresses, and/or data packet size).

The computer system can then implement methods and techniques described above: to merge these network-based endpoint device containers with the endpoint device containers derived from endpoint security technology logs described above; to populate the manifest with unique endpoint device identifiers represented across these endpoint device containers; and to label each of these unique endpoint device identifiers with combinations of security technologies that detected these endpoint devices during the target time interval (i.e., none, one, two, . . . , or all security technologies specified by the security policy). For example, if the computer system identifies a particular endpoint device—within the computer network—in an endpoint device container derived from the network activity log but fails to match the endpoint device container to another endpoint device container derived from a log published by at least one endpoint security technology, the computer system can: write a unique endpoint device identifier of this particular endpoint device to the manifest; and label this unique endpoint device identifier with absence of any deployed or active security technology.

Therefore, the computer system can implement methods and techniques described above to fuse unified security technology inventory with network and/or firewall activity logs to detect endpoint devices connected to the computer network but not executing any security technology designated in the security policy.

10. Security Policy

In one variation, the computer system: accesses a security policy for the computer network in Block S170; and generates a prompt to selectively investigate endpoint devices in Block S172 based on deviation from the security policy. More specifically, the computer system can: access the security policy that defines rules for combinations and configurations of security technologies (and non-security tools) deployed on endpoint devices connected to the computer network; compare these rules to endpoint device configurations recorded in the current manifest; detect differences between these rules and configurations of individual endpoint devices (or groups, clusters of endpoint devices); and selectively prompt security personnel to investigate these endpoint devices. For example, in response to identifying a particular endpoint device that deviates from a security technology configuration rule contained in the security policy, the computer system can prompt security personnel to: quarantine the endpoint device; push a systems or security technology update to the endpoint device; or limit account or user access at the endpoint device until the endpoint device is properly reconfigured.

For example, the computer system can implement methods and techniques described above to: identify the first subset of endpoint devices configured with the first security technology in a first configuration and the second security technology in a target configuration based on correspondence between fixed identifying data and variable status data contained in a first subset of endpoint device containers generated from objects polled from these security technologies; identify a second subset of endpoint devices configured with the first security technology and excluding the second security technology based on absence of correspondence between fixed identifying data and variable status data contained in a second subset of endpoint device containers associated with the first security technology and the second security technology; and identify a third subset of endpoint devices configured with the first security technology in a second configuration and the second security technology in the target configuration based on correspondence between fixed identifying data and variable status data contained in the third subset of endpoint device containers associated with the first security technology and the second security technology.

Accordingly, in response to the security policy specifying deployment of the first security technology in the first configuration and the second security technology in the target configuration, the computer system can: flag the second and third subsets of endpoint devices; generate a prompt to selectively investigate the second subset of endpoint devices for absence of the second security technology; generate a second prompt to selectively investigate the third subset of endpoint devices for improper configuration of the first security technology; and serve the first and second prompts to security personnel affiliated with the computer network.

As described above, the computer system can: poll objects from the set of security technologies during the first time interval at a first polling frequency; and can compile objects collected from security technologies during the first time interval into object groups and a manifest of endpoint devices connected to the computer network during the first time interval. However, in response to identifying a subset of endpoint devices that fail to fulfill the security policy, the computer system can: increase polling frequency for all security technologies, for security technologies that are improperly configured within this subset of endpoint devices, or for this subset of endpoint devices specifically; and update the manifest (or create new manifests) at an increased frequency (e.g., hourly rather than daily) in light of these noncompliant endpoint devices. For example, the computer system can: increase a polling frequency during a current time interval in response to detecting an increase quantity (or ratio) of endpoint devices on the computer network that are improperly configured; generate sets of endpoint device containers based on objects polled from the set of security technologies at this increased polling frequency; update the manifest of endpoint devices and configurations at a greater frequency based on the endpoint device containers; and selectively update and prompts to investigate non-compliant endpoint devices represented in these manifest updates.

11. Next Polling Interval

The computer system can repeat the foregoing process over time—such as within predefined polling intervals (e.g., hourly, daily, weekly) or when triggered by security personnel—to: aggregate (e.g., poll) objects from security technologies (and/or productivity tools, etc.) deployed on endpoint devices on the computer network; derive statuses of these endpoint devices from these objects; and generate a new manifest for each polling interval.

In particular, the computer system can execute Blocks of the method S100 during a first time interval to generate the manifest representing configurations of endpoint devices connected to the network during the first time interval. Later, the computer system can repeat the process to update the manifest (or generate a new manifest) that represents configurations of endpoint devices connected to the network during this next time interval.

12. Change Events

Block S192 of the method S100 recites, in response to a second address of a first endpoint device represented in a second manifest corresponding to a second time interval differing from a first address of the first endpoint device represented in a first manifest corresponding to a first, preceding time interval: generating a first attribute remove event specifying removal of the first address from the first endpoint device; and generating a first attribute add event specifying addition of the second address to the first endpoint device.

Similarly, Block S192 of the method S100 recites, in response to detection of a first endpoint device by the first security tool indicated in a second manifest corresponding to a second time interval and differing from absence of detection of the first endpoint device by the first security tool indicated in a first manifest corresponding to a first, preceding time interval: generating a first source add event specifying addition of the first security tool to the first endpoint device.

Similarly, Block S192 of the method S100 recites, in response to absence of detection of a first endpoint device by the first security tool indicated in a second manifest corresponding to a second time interval and differing from detection of the first endpoint device by the first security tool indicated in a first manifest corresponding to a first, preceding time interval: generating a first source remove event specifying removal of the first security tool from the first endpoint device.

Generally, in Blocks S190 and S192, the computer system can detect change events occurring at individual endpoint devices based on status and attribute differences—for these endpoint devices—represented in consecutive manifests generated by the computer system.

13.1 Correlation and Comparison

In one implementation, the computer system can execute Blocks of the method S100 to correlate and compare a state and status of an object or a device at two or more selected times. Generally, the computer system can correlate and compare a state and status of a set of devices and/or all devices on the computer network at two or more selected times to generate a comprehensive and time-based characterization of the set of devices and the computer network. For example, the computer system can, for a single device or a set of devices, compare a first manifest derived from a first poll to a second manifest derived from a second poll. The computer system can then compare a first and second state and/or status of the device or set of devices to determine if there are any time-based changes in the state and/or status of the device, (e.g., a telemetry of the device or set of devices.)

Generally, the computer system can compare a prior manifest to a current manifest, thereby generating a real-time or near real-time understanding of any change events that have occurred for the selected device or set of devices on the computer network. Alternatively, the computer system can compare sets or groups of current and prior manifests to detect and/or determine large scale patterns of security policy compliance or non-compliance for the selected device or set of devices. Generally, a change event can include both changes of state (e.g., provisioning, inventorying, changing location) and changes of status (OS upgrading, deploying new security technologies, assigning IP addresses, etc.).

As shown in FIG. 1B, the computer system can execute Block S130 of the method S100 to, for each endpoint device connected to the computer network, detect a change of state by comparing a first (current) manifest to a second (prior) manifest. As described above, a change in state can include a provisioning or deprovisioning of an endpoint device, for example when a new employee is onboarded and given an enterprise laptop or smartphone. A prior manifest may indicate that the newly provisioned laptop was associated with another user (e.g., recycled within the enterprise). Alternatively, the newly provisioned laptop may not appear on the prior manifest, in which case the computer system can identify the newly provisioned laptop as also being new to the enterprise.

In another example implementation, the computer system can execute Block S130 of the method S100 to detect a change of state in an endpoint device including a change in location or connection status of the endpoint device. Generally, an endpoint device, such as a laptop, can connect to the computer network via an associated IP address, which in turn can be dynamic or static in nature, and which can also be indicative of a general or specific location of the endpoint device. Accordingly, if the computer system detects a change in IP address associated with an endpoint device between a current and prior manifest, the computer system can, in turn, determine a change of state in the endpoint device. Therefore, the computer system can execute Blocks of the method S100 to determine if a user has moved the device between locations and accessed the computer network from different locations, some or all of which may deviate from the security policy.

As shown in FIG. 1B, the computer system can execute Block S140 of the method S100 to, for each endpoint device connected to the computer network, detect a change of status. As described above, a change of status can include a change in the operating parameters of the endpoint device, such as the operating system, security technologies, port activity, communication hardware access, authentication tools, and/or encryption tools. For example, the computer system can detect a change of status of an endpoint device if, according to distinct manifests, there is a change of the version of the operating system installed on the endpoint device. Therefore, if the enterprise requires that all users upgrade their operating systems to a newer or more secure version, then the computer system can execute Blocks of the method S100 to: poll the set of security technologies of the enterprise endpoints at regular intervals; generate manifests for each uniquely identified endpoint; and correlate and compare the periodic manifests to determine a level of compliance with the enterprise OS requirements. Additionally, as noted in more detail below, the computer system can automatically transmit notifications of changes, security policy compliance, or security policy non-compliance to operators and/or other users within the enterprise.

In another example implementation, the computer system can execute Blocks of the method S100 to determine a change of status of an endpoint device relating to a security technology operating on the endpoint device. For example, an enterprise policy may require that users of mobile computing devices (e.g., laptops, tablets, or smartphones) maintain a minimum level of encryption of the data stored thereon. The computer system can therefore: periodically poll the set of security technologies of the enterprise endpoints; generate manifests for each uniquely identified endpoint; and correlate and compare the periodic manifests to determine if any endpoint devices have changed status in the implementation of required encryption technologies.

Generally, the computer system can implement Blocks of the method S100 to detect, categorize, and correlate changes over time in an endpoint device status. Therefore, for a single asset or device, the computer system can detect and construct a timeline of its changes (either in state or status) over time. Similarly, for a set of assets or devices associated with the network, the computer system can detect, aggregate, and construct a timeline of their collective changes (either in state or status) over time. Additionally, the computer system can detect and construct a timeline of changes on or to the computer network as a composite of device changes (in status or state) over time, for example by generating a computer network perspective of a timeline illustrating a level of compliance with security technology adoption at endpoint devices over time.

Furthermore, the computer system can execute Blocks of the method S100 to detect, determine, construct, and present changes in state or status that are indicative of a user-device relationship. Therefore, the computer system can detect changes in state or status for a user and, in response thereto, generate user behavior analytics that are indicative of a user's behavior vis-à-vis her device. For example, the computer system can generate a timeline of an endpoint device that may indicate that a user device experienced changes in access, authorization, or authentication technologies including for example: biometric or two-factor authentication enabled/disabled, additional/unknown users with administrative privileges on the endpoint device, or successive or repeated changes in a password or other authentication tool.

Similarly, the computer system can generate a timeline of an endpoint device that may indicate that a user device experienced repeated or successive IP address assignments, computer network accesses from disparate or undesirable locations, and/or computer network accesses at odd or off hours (e.g., non-work hours, weekends, holidays, etc.).

In another example implementation, the computer system can generate a timeline of an endpoint device that may indicate that a user device experienced repeated or successive changes in or failures to run required or suggested security technologies in violation of the security policy.

In another example implementation, the computer system can generate a timeline of an endpoint device that illustrates a complete history of the device from its initial provisioning into the computer network. Furthermore, the computer system can generate a volatility model (e.g., rate of change of changes at the endpoint device) that is indicative of a potential user behavior security issue. For example, the computer system can determine, from a series of successive manifests, that a particular endpoint device has experienced a set of changes in state or status, and that timing of the set of changes is indicative of an accelerating pattern of behavior that poses a risk to the enterprise (e.g., because the user is exhibiting risky behaviors and/or because the endpoint device is malfunctioning or nearing its end of service).

12.2 Source Add/Remove Event

In one implementation, in response to generation of a current manifest, the computer system: selects a first endpoint device represented in this current manifest; retrieves a preceding manifest generated immediately prior to this current manifest; and scans the current manifest and the preceding manifest for security tools affiliated with the first endpoint device (i.e., security tools that detected the first endpoint device during time intervals corresponding to the current and preceding manifests).

Then, if the first endpoint device is represented in both the current and preceding manifests, as detected by an identical list of security tools during the corresponding time intervals, the computer system can: label the first endpoint device as "active" in the current manifest; but generate no additional source-related change events.

Conversely, if the first endpoint device is represented in the current manifest as detected by a first security tool (e.g., a set of objects generated during the current time interval includes at least one object generated by the first security tool and identifying the first endpoint device) but is represented in the preceding manifest as not detected by the first security tool (e.g., a set of objects generated during the preceding time interval excludes objects generated by the first security tool and identifying the first endpoint device), the computer system can: label the first endpoint device as "active" in the current manifest; and generate a source add change event indicating addition of the first security tool at the first endpoint device during the current time interval (or specifically at a timestamp of a first object generated by the first security tool during the current time interval and listing the first endpoint device).

Similarly, if the first endpoint device is represented in the preceding manifest as detected by the first security tool, but is represented in the current manifest as not detected by the first security tool, the computer system can: generate a source remove change event indicating removal of the first security tool from the first endpoint device during the current time interval (or specifically at a timestamp of a last object generated by the first security tool during the preceding time interval and listing the first endpoint device).

For example, the computer system can confirm detection of the first endpoint device by the first security tool during the current time interval based on presence of a first object—associated with the first security tool—in a set of objects collected from the first security tool during the current time interval (or in a set endpoint device containers assembled from objects published by the first security tool during the current time interval). Similarly, the computer system can confirm absence of detection of the first endpoint device by the first security tool during the current time interval based on absence of a single object—associated with the first security tool—from the set of objects collected from the first security tool during the current time interval (or from a set of endpoint device containers assembled from objects published by the first security tool during the current time interval).

Figure 2:
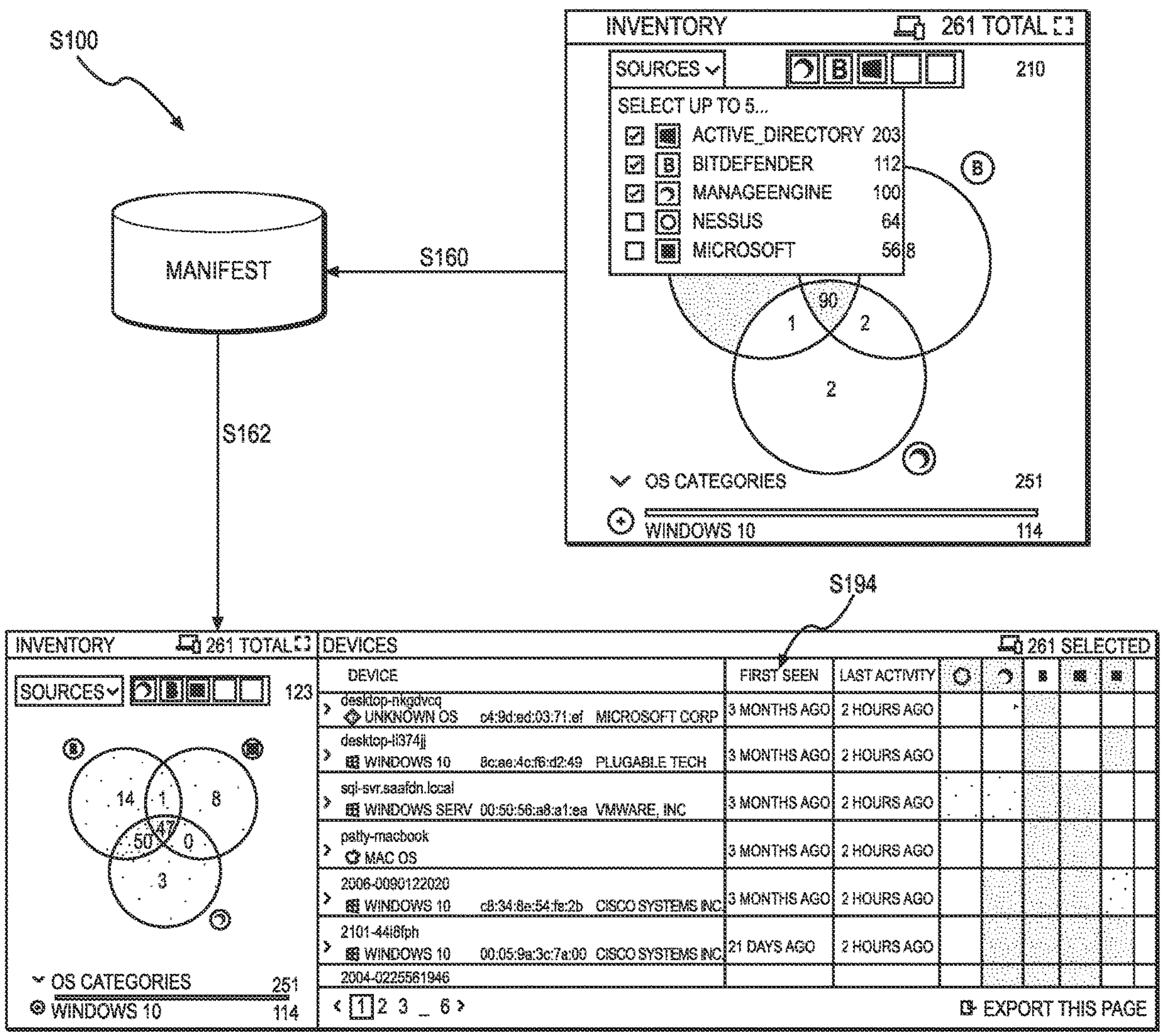
FIG. 2 is a flowchart representation of one variation of the method.

The computer system can: repeat this process to selectively generate source add and remove change events—specific to the first endpoint device—for each other security tool deployed on the computer network based on security tool data stored in the current and preceding manifests; and store these source add change events, source remove change events, and active device labels in a device record associated with the first endpoint device. The computer system can further repeat this process for each other endpoint device identified in the current and preceding manifests to: selectively generate source add and remove change events for all endpoint devices connected to the computer network during the current and preceding time intervals and represented in the corresponding manifests; and populate device records for these endpoint devices accordingly. The computer system can later identify these active (and/or inactive) endpoint devices in a graphical visualization representing endpoint device status in Block S194, as shown in FIG. 2.

13.3 Attribute Add/Remove Event

In one implementation, in response to generation of a current manifest, the computer system: selects a first endpoint device represented in this current manifest; retrieves a preceding manifest generated immediately prior to this current manifest; and scans the current manifest and the preceding manifest for attributes (e.g., host name, address, location, username, operating system, port configuration) of the first endpoint device (e.g., detected by network sensors, security tools, productivity tools, etc.) deployed on the network during time intervals corresponding to the current and preceding manifests.

Then, if the first endpoint device is represented with identical attributes in both the current and preceding manifests, the computer system can generate no additional attribute-related change events.

Conversely, if the first endpoint device is represented with a first attribute (e.g., a first host name, first address, first location, first username, first operating system, or first port configuration) in the first manifest, but is not represented with this first attribute in the preceding manifest, the computer system can generate an attribute add change event indicating addition of the first attribute at the first endpoint device during the current time interval. In particular, the computer system can generate an attribute add change event indicating addition of the first attribute at the first endpoint device if the first endpoint device is not represented in the preceding manifest (e.g., if no security tool detected the first endpoint device during the preceding time interval) or if the first endpoint device is represented in the preceding manifest, but without the first attribute.

Similarly, if the first endpoint device is represented with a first attribute in the preceding manifest, but is not represented with the first attribute in the current manifest, the computer system can: generate an attribute remove change event indicating removal of the first attribute from the first endpoint device during the current time interval.

For example, the computer system can confirm detection of the first endpoint device by the first security tool during the current time interval based on presence of a first object—associated with the first security tool—in a set of objects collected from the first security tool during the current time interval (or in a set of endpoint device containers assembled from objects published by the first security tool during the current time interval). Similarly, the computer system can confirm absence of detection of the first endpoint device by the first security tool during the current time interval based on absence of a single object—associated with the first security tool—from the set of objects collected from the first security tool during the current time interval (or from a set of endpoint device containers assembled from objects published by the first security tool during the current time interval).

For example, the computer system can: aggregate a first group of objects—from a first set of objects published by the set of security tools during the current time interval—solely representing the first endpoint device based on presence of a set of analogous attributes (e.g., address, operating system, username) and a first set of concurrent endpoint device status changes contained in the first group of objects, as described above; extract a set of addresses (e.g., host names, MAC addresses, or IP addresses) from this first group of objects; and then implement methods and techniques described above to consolidate this set of analogous addresses into one address value of the first endpoint device during the current time interval. The computer system can similarly execute this process to derive one address value for the first endpoint device based on attributes contained in objects generated by the set of security tools and representing the first endpoint device during the preceding time interval.

In another example, the computer system can: detect presence of the first endpoint device in an on-premise location during current and preceding time intervals based on attributes of the first endpoint device recorded in the current and preceding manifests; and generate no location-based change event accordingly for the current time. Alternatively, the computer system can: detect presence of the first endpoint device in the on-premise location during the current time interval based on attributes of the first endpoint device recorded in the current manifest; detect presence of the first endpoint device in an off-premise location during the preceding time interval based on attributes of the first endpoint device recorded in the preceding manifest; generate an attribute (or location) remove event specifying removal of the first endpoint device from the off-premise location during the current time interval; and generate an attribute (or location) add event specifying transfer of the first endpoint device to the on-premise location during the current time interval accordingly. Conversely, the computer system can: detect presence of the first endpoint device in the off-premise location during the current time interval based on attributes of the first endpoint device recorded in the current manifest; detect presence of the first endpoint device in the on-premise location during the preceding time interval based on attributes of the first endpoint device recorded in the preceding manifest; generate an attribute (or location) remove event specifying removal of the first endpoint device from the on-premise location during the current time interval; and generating an attribute (or location) add event specifying transfer of the first endpoint device to the off-premise location during the current time interval accordingly. The computer system can then write such attribute (or location) change events to the device record affiliated with the endpoint device.

The computer system can: repeat this process to selectively generate attribute add and remove change events—specific to the first endpoint device—for each other security tool deployed on the computer network based on attributes of the first endpoint device stored in the current and preceding manifests; and store these attribute add change events and attribute remove change events in the device record associated with the first endpoint device. The computer system can further repeat this process for each other endpoint device identified in the current and preceding manifests to: selectively generate attribute add and remove change events for all endpoint devices connected to the computer network during the current and preceding time intervals and represented in the corresponding manifests; and populate device records for these endpoint devices accordingly.

13.4 Security Policy Change Event

In one variation, the computer system: accesses a security policy specifying deployment of a set of security tools on each endpoint device connected to a computer network; and compares security tools installed on each endpoint device to this security policy to track whether each endpoint device is properly configured according to the security policy.

In one implementation, in response to generation of a current manifest, the computer system: selects a first endpoint device represented in this current manifest; scans the current manifest for a list of security tools affiliated with the first endpoint device (i.e., security tools that detected the first endpoint device during the current time interval); and compares this list of security tools to the security policy. If the list of security tools contains all security tools specified in the security policy, the computer system can: label the first endpoint device as policy-verified; generate a security policy verification event indicating verification of security tools deployed on the first endpoint device during current time interval; and write this event to the device record associated with the first endpoint device. Conversely, if the list of security tools contains fewer than all security tools specified in the security policy, the computer system can: label the first endpoint device as policy-failed; generate a security policy negation event indicating incomplete configuration of security tools deployed on the first endpoint device during the current time interval; and write this event to the device record associated with the first endpoint device.

Furthermore, if the first endpoint device is security-verified during the current time interval according to the current manifest, but security-failed during the preceding time interval according to the preceding manifest, the computer system can generate a security policy failure change event for the current time interval and write this policy failure change to the device record associated with the first endpoint device. Conversely, if the first endpoint device is security-failed during the current time interval according to the current manifest, but security-verified during the preceding time interval according to the preceding manifest, the computer system can generate a security policy verification change event for the current time interval and write this policy failure change to the device record associated with the first endpoint device.

The computer system can repeat this process for each other endpoint device identified in the current manifest to: selectively generate policy verification and failure change events for all endpoint devices connected to the computer network during the current time interval and represented in the corresponding manifests; and populate device records for these endpoint devices accordingly.

13.5 Active/Inactive Device Event

As described above, the computer system can label each endpoint device—identified in objects generated by a security tool, etc. during the current time interval—as active.

Furthermore, in response to absence of an object identifying a particular endpoint device—in any object generated by a security tool, etc.—for more than a threshold duration of time (e.g., one month), the computer system can relabel the device as inactive, which may indicate that the particular endpoint device is no longer connected to, affiliated with, or a risk to the computer network.

For example, in response to detecting presence of objects in a first set of objects—generated by security tools during a first time interval—identifying a first endpoint device, the computer system can label the first endpoint device as active during the current time interval in an endpoint device inventory list associated with the computer network. Later, in response to detecting absence of objects in a second set of objects—generated by security tools during a second time interval—containing characteristics identifying the first endpoint device and in response to the second time interval occurring within a threshold duration (e.g., between one and two months) of the first time interval, the computer system can relabel the first endpoint device as inactive during the second time interval in the endpoint device inventory list. Furthermore, in response to detecting absence of objects in a third set of objects—generated by security tools during a third time interval—containing characteristics identifying the first endpoint device and in response to the third time interval occurring outside of the threshold duration of (e.g., more than two months from) the first time interval, the computer system can remove the first endpoint device from the endpoint device inventory list.

The computer system can repeat this process for each other endpoint device connected to—and later disconnected from—the computer network.

13.6 Device Record

Therefore, the computer system can: generate change events and status labels for each endpoint device; timestamp these change events and status labels; and compile these timestamped change events and status labels into one device record for each endpoint device connected to the computer network over time, wherein each device record contains timestamped change events and status labels of one corresponding endpoint device over the entire period in which the endpoint device is connected to or affiliated with the computer network.

14. Graphical Visualization

Block S194 of the method S100 recites generating a first visualization representing the first set of change events occurring at the first endpoint device over time. Generally, in Block S194, the computer system can implement Blocks of the method S100 to assemble, render, publish, and/or display a set of changes in state or status for a set of devices on the computer network, as shown in FIGS. 1A, 3C, 4, 5, and 7, 14.1 Portfolio Assessment In one variation, the computer system can assemble a portfolio assessment for each period including: the manifest of devices on the computer network and any status and/or state changes for each device on the computer network. Generally, the computer system can assemble the portfolio assessment in a format in which an operator can readily query the computer system and be presented (at the operator portal) device telemetry for a selected device, device group, user, user group, location, security technology, security technology type, device configuration, device type, etc.

Figure 4:
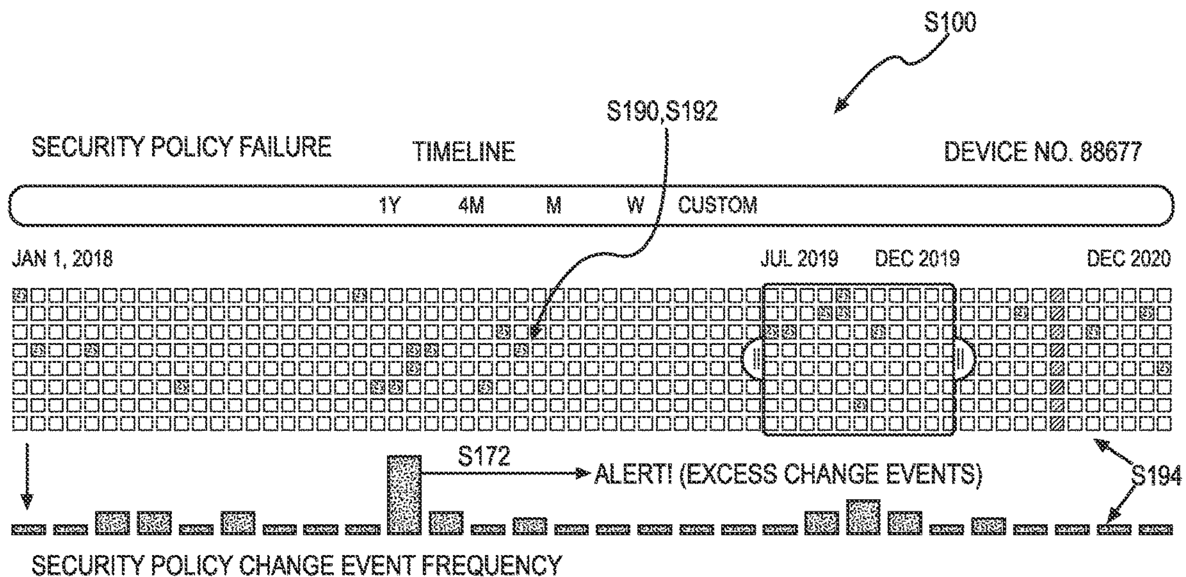
FIG. 4 is a graphical representation of one variation of the method.

For example, as shown in FIGS. 4 and 6, the computer system can render and display an assessment that illustrates: an event distribution for a selected timeline, a listing of attribute changes (e.g., operating system, location, IP address), a frequency and density of attribute changes as a function of time, and a source coverage map of selected security technologies. Therefore, an operator can be presented, and interact with, the assessment for any selected device, device group, user, user group, location, security technology, security technology type, device configuration, and/or device type. Furthermore, as described above, with each successive polling operation executed by the computer system, the computer system can automatically update the assessment to include the new changes, if any, in the particular selection.

In another variation, the computer system can execute Block S172 of the method S100 to periodically publish a notification including changes of state and/or changes of status. Generally, the computer system can periodically publish the notification by transmitting, rendering, or displaying, on a computer associated with the computer network, a human-readable notification or digest presenting the noted changes in state or changes in status. For example, the computer system can display the notification on the operator portal at selected time intervals (e.g., daily digest, hourly updates, etc.) for viewing and assessment by the operator.

In one example implementation, the computer system generates a notification that includes changes in the inventory of devices associated with the computer network. For example, a large enterprise may contain thousands or tens of thousands of devices and associated users, with hundreds of devices and associated users that are coming into and out of the enterprise on a daily basis. Therefore, the computer system can publish a periodic notification, for example at the end of every day, indicating the newly admitted devices and/or newly provisioned IP addresses and the newly departing devices and/or newly deprovisioned IP addresses. Furthermore, the computer system can also publish a longer timeline view of the changes in inventory of devices associated with the computer network, including for example an assessment of the number of devices admitted/provisioned and departing/deprovisioned over a selected longer time period (e.g., months, quarters, years) to assist the operator in better understanding the growth and/or complexity in the enterprise network through the changes in the inventory.

In another example implementation, the computer system generates a notification that includes a list of policy violations detected by the computer system through successive polling of the security technologies deployed by devices across the enterprise. As described above, a large enterprise can include a very large number of devices, each of which employs its own security technologies and can interact with the computer system. Accordingly, the computer system executes Blocks of the method S100 to: detect a policy violation in successive polling events (e.g., a security technology is disabled on a particular device) and notify an operator, network administrator, or security personnel about the policy violation via the operator portal. The computer system can assemble policy violation notifications at selected intervals (e.g., daily or weekly), immediately upon discovery of the policy violation (e.g., real time or near-real time), or at an interval weighted by the risk of the policy violation. For example, if the policy violation is minimal risk, then the computer system can assemble the notification on a longer time interval. Conversely, if the policy violation is higher risk, then the computer system can assemble the notification in real time or near-real time. Furthermore, for higher risk policy violations, the computer system can assemble repeated, constant, or periodic reminder notifications unless and/or until the policy violation is corrected and such correction is confirmed in a subsequent poll of the security technologies deployed on the associated device.

In another example implementation, the computer system can generate a notification that includes user behavior analytics relating to user device attribute change velocity. As described above, the computer system can measure and determine a velocity or volatility in change events for individual devices, a set of devices, or across the computer network as a whole. Accordingly, the computer system can assemble a notification that indicates or illustrates a change in the rate of change events (e.g., volatility or velocity) for a device, device group, user, user group, location, security technology, security technology type, device configuration, device type, etc. Therefore, the computer system can assemble volatility notifications at selected intervals (e.g., weekly or monthly), or in response to a threshold measure of the velocity of change events for any particular device, device group, user, user group, location, security technology, security technology type, device configuration, device type, etc. For example, the computer system can automatically assemble and publish volatility notifications in response to: an excessive number of security technologies being disabled at a device; an excessive number of IP address changes for a device; an excessive number of location changes for a device; an excessive number of policy violations in a time interval; or any combination of the foregoing (e.g., disabled security technologies in combination with excessive IP address and/or location changes for the device).

Figure 5:
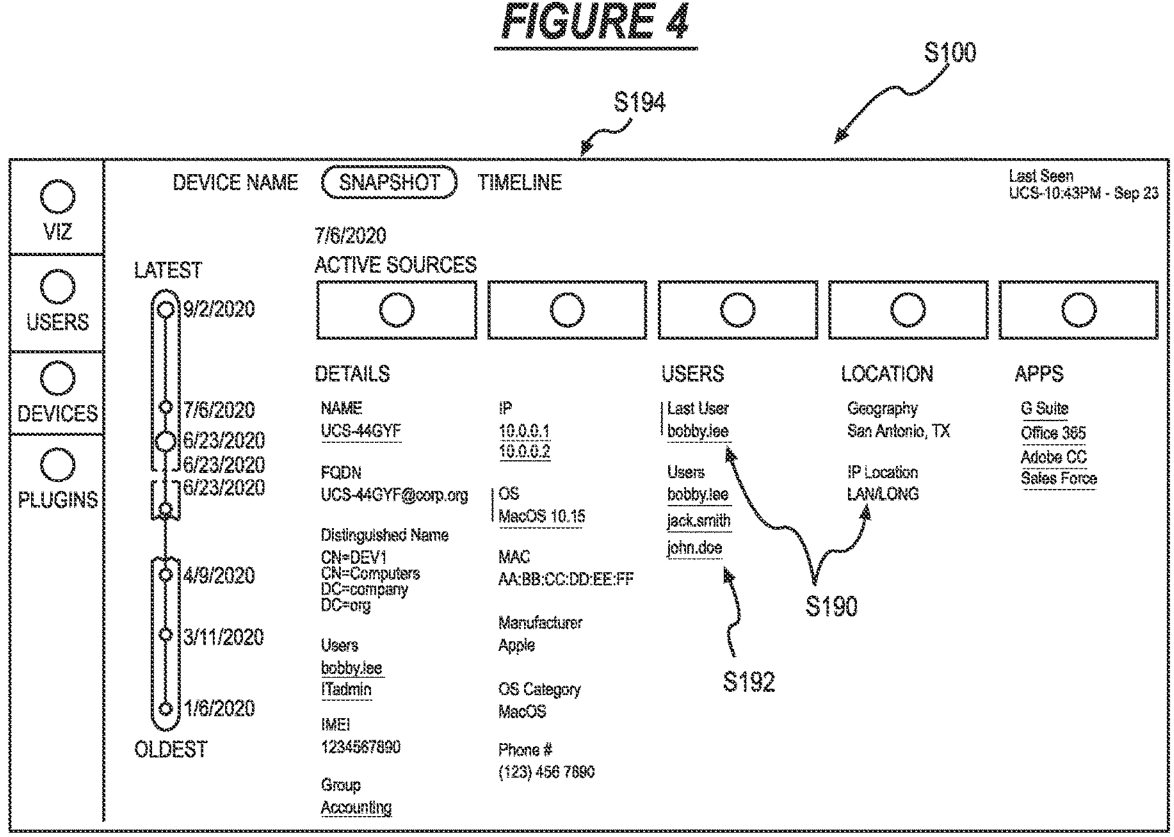
FIG. 5 is a graphical representation of one variation of the method.

In yet another variation, the computer system can execute Block S194 of the method S100 to render, present, and/or display a visualization in response to a search query, for example entered by an operator at the operator portal. As shown in FIG. 5, in response to the search query, the computer system can render, present, and/or display a visualization communicating a snapshot (e.g., current state) of a device, a snapshot of the computer network (or set of devices), a timeline of the device, or a timeline of the computer network (or set of devices).

For example, the computer system can generate and render a snapshot view of a device in response to a search query, as shown in FIG. 5. As shown, the snapshot view of the device can include a set of details including a device name, a fully qualified domain name (FQDN), a distinguished name, a list of users, an international mobile equipment identity (IMEI) designation, a user/device group name, an IP address(es), an operating system, a MAC address, a manufacturer, an OS category, and an associated phone number. The snapshot view of the device can further include a user listing and a history of users, a location of the device and associated IP addresses, and a listing of applications or programs running on the device.

In another example, the computer system can generate and render a timeline view of a device in response to a search query, as shown in FIG. 4. As shown, the timeline view of the device can include a matrix view of changes in a set of changeable attributes (e.g., host name, IP address, geography, domain group, MAC address, user, phone number, FQDN) as a function of a selected timeline (e.g., as shown the months from May 2019 to November 2019). As shown in FIG. 4, the timeline view can also include a selectable timeframe window that can be compressed or expanded by the computer system in response to a selection by an operator through the user interface at the operator portal. Furthermore, changeable attributes can be added or subtracted by the computer system in response to a selection by the operator. Therefore, the computer system can, in response to operator selections, present a timeline view of one or a set of changeable attributes for a device over a selected timeline, thus permitting an operator to interface with the computer system to view and interact with a complete, consistent, and selectable history of the user device.

As described above, the computer system can execute Blocks of the method S100 for any number of selected devices, device groups, users, user groups, locations, security technologies, security technology types, device configurations, and/or device types. Accordingly, each of the representations illustrated in FIGS. 1A, 2, 3C, 4, 5, and 7 should be understood to be exemplary in nature as the computer system can assemble, render, display, and or notify an operator regarding any number of permutations of the foregoing, in combination with any number of permutations of change events and policy violations.

14.2 Metrics and Telemetry: Individual Endpoint Devices

In another variation, the computer system derives metrics and telemetry data for individual endpoint devices connected to the computer network based on the sequence of manifests and/or the set of device records representing statuses and attributes of individual endpoint devices connected to the computer network over time.

In one implementation, the computer system derives metrics for an individual endpoint device, such as including: a quantity of attribute changes at the individual endpoint device per time interval (e.g., attribute add and remove events per hour, day, or week); a quantity of source changes at the individual endpoint device per time interval (e.g., source add and remove events per hour, day, or week); durations of time that the individual endpoint device fulfills and deviates from the security policy; durations of time that the individual endpoint device exhibits each individual attribute; durations of time that each particular security tool is configured on the individual endpoint device; and/or durations of time that the individual endpoint device is active and inactive on the computer network; etc.

In another implementation, the computer system derives telemetry for an individual endpoint device, such as including: a rate of attribute changes at the individual endpoint device (e.g., a quantity of attribute add and remove changes per hour each weekday); a rate of security tool configuration changes at the individual endpoint device (e.g., a quantity of security tool add and remove changes per hour each weekday); rates of transition from fulfillment to failure of the security policy (or vice versa) at the individual endpoint device; and/or whether these rates of change are increasing or decreasing over time.

In another implementation, the computer system derives trends for an individual endpoint device, such as including: common or average quantities of attribute changes at the individual endpoint device per time interval (e.g., average attribute add and remove events at the individual endpoint device every Monday; average attribute add and remove events at the individual endpoint device every weekend day); common or average quantities of source changes at the individual endpoint device per time interval (e.g., average source add and remove events at the individual endpoint device every Monday; average source add and remove events at the individual endpoint device every weekend day); distribution of source removal events for each security tool that yielded security policy failures at the individual endpoint device; and/or whether the individual endpoint device is trending toward longer or shorter periods of fulfilling the security policy; etc. In this implementation, the computer system can also extrapolate these trends to predict future states of the individual endpoint device, such as future times at which the individual endpoint device will: gain or lose a particular attribute; transition to fulfilling the security policy; and transition to failing to fulfill the security policy.

In another implementation, the computer system derives correlations for an individual endpoint device, such as including: correlations between addition or removal of certain attributes and security policy failure at the individual endpoint device; correlations between location, security policy failure, and/or other attribute change events at the individual endpoint device; and correlations between attribute add or remove events and source add or remove events for particular security tools; etc.

However, the computer system can derive any other metrics, trajectories, trends, or correlations for each individual endpoint device.

14.2 Metrics and Telemetry: Endpoint Device Groups

In a similar variation, the computer system derives metrics and telemetry data for group of (e.g., all) endpoint devices connected to the computer network based on the sequence of manifests and/or the set of device records. In one implementation, the computer system derives metrics for all individual endpoint devices represented in manifests generated over a period of time (e.g., one year) or for all endpoint devices identified as currently-active, such as including: a quantity of attribute changes at all active endpoint devices per time interval (e.g., attribute add and remove events per hour, day, or week); a quantity of source changes at these active endpoint devices per time interval (e.g., source add and remove events per hour, day, or week); durations of time that more than a threshold proportion (e.g., 90%) of these active endpoint devices fulfill the security policy; durations of time that less than a threshold proportion (e.g., 85%) of these active endpoint devices fulfill the security policy; durations of time that these active endpoint devices exhibit each individual attribute; durations of time that each particular security tool is configured on more than (or less than) a threshold proportion of these active endpoint devices; and/or durations of time that these active endpoint devices were labeled as active and inactive on the computer network; etc.

In another implementation, the computer system derives telemetry data for all active endpoint devices, such as including: a rate of attribute changes at these active endpoint devices (e.g., a quantity of attribute add and remove changes per hour each weekday); a rate of security tool configuration changes at these active endpoint devices (e.g., a quantity of security tool add and remove changes per hour each weekday); rates of transition from fulfillment to failure of the security policy (or vice versa) at these active endpoint devices; and/or whether these rates of change are increasing or decreasing over time.

In another implementation, the computer system derives trends for all active endpoint devices, such as including: common or average quantities of attribute changes at these active endpoint devices per time interval (e.g., average attribute add and remove events at these active endpoint devices every Monday; average attribute add and remove events at these active endpoint devices every weekend day); common or average quantities of source changes at these active endpoint devices per time interval (e.g., average source add and remove events at these active endpoint devices every Monday; average source add and remove events at these active endpoint devices every weekend day); distribution of source removal events for each security tool that yielded security policy failures at these active endpoint devices; and/or whether these active endpoint devices are trending toward longer or shorter periods of fulfilling the security policy; etc. In this implementation, the computer system can also extrapolate these trends to predict future states of these active endpoint devices, such as future times at which more than a threshold proportion of these active endpoint devices will: gain or lose a particular attribute; transition to fulfilling the security policy; and transition to failing to fulfill the security policy. In this implementation, the computer system can also extrapolate these trends to predict future times at which more than a threshold quantity of endpoint devices will connect to the network, transition to inactive states, or are removed from a directory of active and inactive endpoint devices.

In another implementation, the computer system derives correlations for all active endpoint devices, such as including: correlations between addition or removal of certain attributes and security policy failure at these active endpoint devices; correlations between location, security policy failure, and/or other attribute change events at these active endpoint devices; and correlations between attribute add or remove events and source add or remove events for particular security tools; etc.

However, the computer system can derive any other metrics, trajectories, trends, or correlations for groups of active endpoint devices connected to the computer network.

14.4 Source Coverage Visualization

As shown in FIGS. 1A and 3C, the computer system can then: compile security tool statuses and/or change events of an endpoint device into a source coverage visualization depicting periods in which one or a set of security tools are configured on the endpoint device; and present this visualization to security personnel affiliated with the computer network in Block S194.

The computer system can implement similar methods and techniques to: compile security tool change events for all active endpoint devices into a source coverage visualization depicting configuration of one or a set of security tools across all active endpoint devices; and present this visualization to security personnel affiliated with the computer network in Block S194.

14.5 Security Policy Visualization

As shown in FIG. 4, the computer system can additionally or alternatively: compile security tool statuses, security tool change events, and/or security policy events of an endpoint device into a source coverage visualization depicting periods in which security tool configuration on the endpoint device fulfills (or fails) the security policy assigned to the computer network; and present this visualization to security personnel affiliated with the computer network in Block S194.

The computer system can similarly: compile security tool statuses, security tool change events, and/or security policy events of all active (and inactive) endpoint devices into a network-wide source coverage visualization depicting portions of endpoint devices—connected to the computer network—that fulfill the security policy; and present this visualization to security personnel affiliated with the computer network in Block S194.

14.6 Attribute Visualization

As shown in FIGS. 1A and 5, the computer system can additionally or alternatively: compile attribute change events of an endpoint device into an attribute visualization depicting periods in which the endpoint device exhibits various attributes in various attribute domains; and present this visualization to security personnel affiliated with the computer network in Block S194.

For example and as shown in FIG. 1A, the computer system can generate a graphical timeline representing a first set of change events—in a set of domains including endpoint device address, user, host name, location, and/or operating system, etc.—of an endpoint device, such as detected by multiple security tools deployed on the computer network in Block S194.

In another example shown in FIG. 4, the computer system can: calculate a first frequency of change events occurring at a first endpoint device during a first time interval (e.g., a first day); calculate a second frequency of change events occurring at the first endpoint device during the second time interval (e.g., a second day); and calculate a third frequency of change events occurring at the first endpoint device during the third time interval (e.g., a third day); and generate a visualization depicting the first frequency, the second frequency, and the third frequency of change events occurring at the first endpoint across the first time interval, the second time interval, and the third time interval. In this example, the computer system can also generate a prompt to investigate the first endpoint device if the third frequency exceeds the first frequency and/or the second frequency (or a combination thereof) by more than a threshold difference.

The computer system can similarly: compile attribute change events across all active endpoint devices into a visualization (e.g., a timeline, a histogram as shown in FIG. 1A) depicting frequencies of attribute changes across these endpoint devices over time; and present this visualization to security personnel affiliated with the computer network in Block S194.

However, the computer system can generate visualizations of any other type or format based on change events and endpoint device status represented in a sequence of manifests generated from objects published by the set of security tools (and other tools) deployed on the computer network in Block S194.

As a person skilled in the art will recognize from the previous detailed description and from the figures and claims, modifications and changes can be made to the embodiments of the invention without departing from the scope of this invention as defined in the following claims.

We claim:

1. A method comprising:

populating a device record with a first set of characteristics representing a first endpoint device in a set of endpoint devices, the first set of characteristics:

generated by a set of security technologies during a first time interval; and representing:

detection of the first endpoint device by a first security technology in a set of security technologies during the first time interval; and detection of the first endpoint device by a second security technology in the set of security technologies during the first time interval;

populating the device record with a second set of characteristics representing the first endpoint device, the second set of characteristics:

generated by the set of security technologies; and representing detection of the first endpoint device by the first security technology during a second time interval;

in response to absence of detection of the first endpoint device by the second security technology during the second time interval, generating a first source remove event specifying removal of the second security technology from the first endpoint device; and in response to a third set of characteristics identifying the first endpoint device, labeling the first endpoint device as active in an endpoint device inventory list associated with a computer network during a third time interval.

2. The method of claim 1, further comprising:

identifying the first set of characteristics:

generated by the set of security technologies; and containing cotemporal and analogous characteristics identifying the first endpoint device connected to the computer network during the first time interval; and identifying the second set of characteristics:

generated by the set of security technologies; and containing cotemporal and analogous characteristics identifying the first endpoint device during the second time interval.

3. The method of claim 2:

wherein identifying the first set of characteristics comprises identifying the first set of characteristics based on presence of a first set of analogous addresses and a first set of concurrent endpoint device status changes contained in the first set of characteristics, the first set of characteristics generated by multiple security technologies in the set of security technologies; and wherein populating the device record with the first set of characteristics comprises:

confirming detection of the first endpoint device by the first security technology during the first time interval based on presence of a first object, associated with the first security technology;

confirming detection of the first endpoint device by the second security technology during the first time interval based on presence of a fourth object, associated with the second security technology; and consolidating the first set of analogous addresses into the first address.

4. The method of claim 2:

wherein identifying the second set of characteristics comprises aggregating the second set of characteristics based on presence of a second set of analogous addresses and a second set of concurrent endpoint device status changes contained in the second set of characteristics, the second set of characteristics generated by multiple security technologies in the set of security technologies; and wherein populating the device record with the second set of characteristics comprises confirming detection of the first endpoint device by the first security technology during the second time interval based on presence of a third object, associated with the first security technology.

5. The method of claim 1, further comprising, in response to absence of detection of a second endpoint device by the second security technology during a third time interval, generating a second source remove event, in a first set of change events, specifying removal of the second security technology from the second endpoint device.

6. The method of claim 5, further comprising:

calculating a second frequency of change events during the second time interval based on the first set of change events;

calculating a third frequency of change events during the third time interval based on the first set of change events; and in response to the third frequency exceeding the second frequency by more than a threshold difference:

aggregating a list of endpoint devices associated with change events occurring during the third time interval, the list of endpoint devices identifying the first endpoint device and the second endpoint device; and generating a prompt to investigate endpoint devices identified on the list of endpoint devices.

7. The method of claim 1, further comprising, in response to absence of detection of the second endpoint device by the first security technology during a third time interval, generating a second source remove event, in a first set of change events, specifying removal of the first security technology from the second endpoint device.

8. The method of claim 1, further comprising, in response to a quantity of source remove events, specifying the first security technology and occurring during a third time interval, exceeding a threshold frequency:

generating a prompt to investigate configuration of the first security technology on the computer network; and serving the prompt to security personnel affiliated with the computer network.

9. The method of claim 1, further comprising:

accessing a security policy specifying deployment of a set of security technologies on endpoint devices connected to the computer network; and based on the security policy and in response to detection of the first endpoint device by the first security technology and the second security technology during the first time interval, generating a first security policy verification event, in a set of security policy events, indicating verification of security technologies deployed on the first endpoint device during first time interval.

10. The method of claim 1, further comprising:

accessing a security policy specifying deployment of a set of security technologies on endpoint devices connected to the computer network; and based on the security policy, in response to detection of the first endpoint device by the first security technology during the second time interval, and in response to absence of detection of the first endpoint device by the second security technology during the second time interval, generating a security policy negation event, in the set of security policy events, indicating incomplete configuration of security technologies deployed on the first endpoint device during second time interval.

11. The method of claim 10, further comprising:

based on the security policy negation event and in response to a time duration from the second time interval to the third time interval exceeding a threshold duration, generating a prompt to investigate configuration of the second security technology at the first endpoint device.

12. The method of claim 1:

wherein populating the device record with the first set of characteristics comprises populating the device record with the first set of characteristics further comprising presence of the first endpoint device in an on-premises location during the first time interval; and wherein populating the device record with the second set of characteristics comprises populating the device record with the second set of characteristics further comprising presence of the first endpoint device in an off-premises location during the second time interval.

13. The method of claim 12, further comprising, in response to presence of the first endpoint device in an off-premises location during the second time interval:

generating a second attribute remove event, in a first set of change events, specifying removal of the first endpoint device from the on-premises location; and generating a second attribute add event, in the first set of change events, specifying addition of the first endpoint device to the off-premises location.

14. The method of claim 1, further comprising:

calculating a first frequency of change events during the first time interval based on a first set of change events;

calculating a second frequency of change events during the second time interval based on the first set of change events;

calculating a third frequency of change events during a third time interval based on the first set of change events;

generating a visualization depicting the first frequency, the second frequency, and the third frequency of change events occurring at the first endpoint device across the first time interval, the second time interval, and the third time interval; and in response to the third frequency exceeding the second frequency by more than a threshold difference, generating a prompt to investigate the first endpoint device.

15. The method of claim 1, further comprising, generating a first set of endpoint device containers by, for each security technology in the set of security technologies:

accessing a first set of objects generated by the security technology during the first time interval and representing characteristics identifying a subset of endpoint devices, in the first set of endpoint devices, configured with the security technology;

partitioning the first set of objects into a first set of object groups, each object group in the first set of object groups representing a sequence of statuses of an endpoint device, in the subset of endpoint devices, during the first time interval; and for each object group in the first set of object groups, aggregating characteristics represented in objects in the first object group into an endpoint device container, in the first set of endpoint device containers, associated with the security technology and comprising attributes representing an endpoint device in the subset of endpoint devices.

16. The method of claim 1, further comprising:

generating a first set of endpoint device containers by, for each security technology in the set of security technologies:

ingesting objects comprising log events streamed by the security technology for endpoint devices, in the first set of endpoint devices, configured with the security technology during the first time interval; and aggregating objects represented in the log events into an endpoint device container comprising attributes representing an endpoint device.

17. A method comprising:

accessing a security policy specifying deployment of a set of security technologies on endpoint devices connected to a computer network;

identifying a first set of characteristics generated by the set of security technologies during a first time interval, containing cotemporal and analogous characteristics identifying a first endpoint device in a set of endpoint devices connected to the computer network;

populating a device record with the first set of characteristics representing the first endpoint device, the first set of characteristics comprising:

detection of the first endpoint device by a first security technology in the set of security technologies during the first time interval; and detection of the first endpoint device by a second security technology in the set of security technologies during the first time interval;

based on the security policy and in response to detection of the first endpoint device by the first security technology and the second security technology during the first time interval, generating a first security policy verification event, in a set of security policy events, indicating verification of security technologies deployed on the first endpoint device during first time interval; and in response to a frequency of security policy negation events for endpoint devices in the set of endpoint devices exceeding a threshold frequency during a second time interval:

aggregating a list of endpoint devices associated with security policy negation events occurring during the second time interval, the list of endpoint devices identifying the first endpoint device; and generating a prompt to investigate endpoint devices identified on the list of endpoint devices.

18. A method comprising:

populating a device record with a first set of characteristics representing a first endpoint device in a set of endpoint devices, the first set of characteristics:

generated by a set of security technologies during a first time interval; and representing:

detection of the first endpoint device by a first security technology in a set of security technologies during the first time interval; and detection of the first endpoint device by a second security technology in the set of security technologies during the first time interval;

populating the device record with a second set of characteristics representing the first endpoint device, the second set of characteristics:

generated by the set of security technologies; and representing detection of the first endpoint device by the first security technology during a second time interval;

in response to absence of detection of the first endpoint device by the second security technology during the second time interval, generating a first source remove event specifying removal of the second security technology from the first endpoint device; and in response to absence of detection of the second endpoint device by the first security technology during a third time interval, generating a second source remove event, in a first set of change events, specifying removal of the first security technology from the second endpoint device.

19. A method comprising:

populating a device record with a first set of characteristics representing a first endpoint device in a set of endpoint devices, the first set of characteristics:

generated by a set of security technologies during a first time interval; and representing:

detection of the first endpoint device by a first security technology in the set of security technologies during the first time interval; and detection of the first endpoint device by a second security technology in the set of security technologies during the first time interval;

populating the device record with a second set of characteristics representing the first endpoint device, the second set of characteristics:

generated by the set of security technologies; and representing detection of the first endpoint device by the first security technology during a second time interval;

in response to absence of detection of the first endpoint device by the second security technology during the second time interval, generating a first source remove event specifying removal of the second security technology from the first endpoint device; and in response to a quantity of source remove events, specifying the first security technology and occurring during a third time interval, exceeding a threshold frequency:

generating a prompt to investigate configuration of the first security technology on a computer network; and serving the prompt to security personnel affiliated with the computer network.

20. A method comprising:

populating a device record with a first set of characteristics representing a first endpoint device in a set of endpoint devices, the first set of characteristics:

generated by a set of security technologies during a first time interval; and representing:

detection of the first endpoint device by a first security technology in the set of security technologies during the first time interval; and detection of the first endpoint device by a second security technology in the set of security technologies during the first time interval;

populating the device record with a second set of characteristics representing the first endpoint device, the second set of characteristics:

generated by the set of security technologies; and representing detection of the first endpoint device by the first security technology during a second time interval;

in response to absence of detection of the first endpoint device by the second security technology during the second time interval, generating a first source remove event specifying removal of the second security technology from the first endpoint device;

accessing a security policy specifying deployment of a set of security technologies on endpoint devices connected to a computer network;

based on the security policy, in response to detection of the first endpoint device by the first security technology during the second time interval, and in response to absence of detection of the first endpoint device by the second security technology during the second time interval, generating a security policy negation event, in the set of security policy events, indicating incomplete configuration of security technologies deployed on the first endpoint device during second time interval; and based on the security policy negation event and in response to a time duration from the second time interval to the third time interval exceeding a threshold duration, generating a prompt to investigate configuration of the second security technology at the first endpoint device.

* * * * *